(12) United States Patent
Watanabe et al.

(10) Patent No.: US 11,079,262 B2
(45) Date of Patent: Aug. 3, 2021

(54) PHYSICAL QUANTITY DETECTION APPARATUS AND ELECTRONIC APPARATUS

(71) Applicant: HITACHI AUTOMOTIVE SYSTEMS, LTD., Hitachinaka (JP)

(72) Inventors: Tsubasa Watanabe, Tokyo (JP); Tsutomu Kono, Tokyo (JP); Hiroaki Hoshika, Hitachinaka (JP); Takahiro Miki, Hitachinaka (JP); Takayuki Yogo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 423 days.

(21) Appl. No.: 15/547,270

(22) PCT Filed: Oct. 28, 2015

(86) PCT No.: PCT/JP2015/080311
§ 371 (c)(1),
(2) Date: Jul. 28, 2017

(87) PCT Pub. No.: WO2016/121179
PCT Pub. Date: Aug. 4, 2016

(65) Prior Publication Data
US 2018/0023983 A1    Jan. 25, 2018

(30) Foreign Application Priority Data

Jan. 30, 2015   (JP) .............................. JP2015-016321

(51) Int. Cl.
*G01D 11/24* (2006.01)
*G01F 1/684* (2006.01)
(Continued)

(52) U.S. Cl.
CPC ....... *G01D 11/245* (2013.01); *F02M 35/1038* (2013.01); *F02M 35/10386* (2013.01);
(Continued)

(58) Field of Classification Search
CPC ............. G01D 11/245; F02M 35/1038; F02M 35/10386; F02M 35/10393; F02D 35/02;
(Continued)

(56) References Cited

U.S. PATENT DOCUMENTS 5,186,044 A * 2/1993 Igarashi ................ G01F 1/684
73/114.34
6,012,339 A * 1/2000 Genack .................. G01F 1/075
73/861.77
(Continued)

FOREIGN PATENT DOCUMENTS

CN     101216331 A    7/2008
DE     10344493 A1    5/2004
(Continued)

OTHER PUBLICATIONS

International Search Report WO 2016/121179 A1, dated Feb. 16, 2016.
(Continued)

*Primary Examiner* — Robert R Raevis
(74) *Attorney, Agent, or Firm* — Volpe Koenig

(57) ABSTRACT

To obtain a physical quantity detection apparatus that can reduce the outer shape of a housing in size.
A physical quantity detection apparatus 300 detects a plurality of physical quantities of gas 30 to be measured flowing in a main passage 124. The physical quantity detection apparatus 300 has a housing 302 disposed in the main passage 124, a circuit substrate 400 insert molded in the housing 302, and a plurality of detection sensors 452, 453,
(Continued)

454, 455, and 456 each mounted on each of one face and the other face of the circuit substrate 400.

11 Claims, 29 Drawing Sheets

(51) Int. Cl.
  *F02M 35/10* (2006.01)
  *F02D 35/02* (2006.01)
  *F02D 37/02* (2006.01)
  *G01F 15/14* (2006.01)
  *G01K 1/14* (2021.01)
  *G01L 19/14* (2006.01)
  *G01N 35/00* (2006.01)
(52) U.S. Cl.
  CPC ....... *F02M 35/10393* (2013.01); *G01F 1/684* (2013.01); *F02D 35/02* (2013.01); *F02D 37/02* (2013.01); *G01F 15/14* (2013.01); *G01K 1/14* (2013.01); *G01L 19/14* (2013.01); *G01N 35/00* (2013.01); *G01N 2035/00306* (2013.01)
(58) Field of Classification Search
  CPC ........... F02D 37/02; G01F 15/14; G01K 1/14; G01L 19/14; G01N 35/00; G01N 2035/00306
  See application file for complete search history.

(56) References Cited

U.S. PATENT DOCUMENTS

| | | | |
|---|---|---|---|
| 2004/0011125 A1* | 1/2004 | Kozawa | G01F 1/6842 73/204.22 |
| 2004/0055376 A1 | 3/2004 | Thompson et al. | |
| 2005/0120790 A1 | 6/2005 | Tanaka et al. | |
| 2008/0163683 A1 | 7/2008 | Becke et al. | |
| 2008/0307869 A1 | 12/2008 | Kamiya | |
| 2008/0314118 A1 | 12/2008 | Bey, Jr. et al. | |
| 2010/0031737 A1 | 2/2010 | Saito et al. | |
| 2011/0072894 A1 | 3/2011 | Saito et al. | |
| 2011/0107832 A1 | 5/2011 | Sakuma | |
| 2011/0296904 A1* | 12/2011 | Tagawa | G01F 1/684 73/114.32 |
| 2012/0198925 A1 | 8/2012 | Saito et al. | |
| 2012/0247202 A1* | 10/2012 | Kohno | G01F 1/6842 73/204.25 |
| 2013/0019675 A1 | 1/2013 | Ban et al. | |
| 2013/0036806 A1 | 2/2013 | Kohno | |
| 2013/0269419 A1 | 10/2013 | Etherington et al. | |
| 2014/0116122 A1 | 5/2014 | Lammel et al. | |
| 2014/0226732 A1 | 8/2014 | Wang et al. | |
| 2015/0354512 A1 | 12/2015 | Tsujii | |
| 2017/0248455 A1 | 8/2017 | Miki et al. | |

FOREIGN PATENT DOCUMENTS

| | | |
|---|---|---|
| DE | 102008001980 A1 | 12/2008 |
| EP | 1128168 A2 | 8/2001 |
| EP | 1279934 A2 | 1/2003 |
| EP | 2154494 A1 | 2/2010 |
| EP | 2320200 A1 | 5/2011 |
| EP | 3026402 A1 | 6/2016 |
| EP | 3176544 A1 | 6/2017 |
| EP | 3176545 A1 | 6/2017 |
| EP | 3176546 A1 | 6/2017 |
| EP | 3232167 A1 | 10/2017 |
| JP | 06-265384 A | 9/1994 |
| JP | 2000-028411 A | 1/2000 |
| JP | 2005-172526 A | 6/2005 |
| JP | 2008-182089 A | 8/2008 |
| JP | 2010-043883 A | 2/2010 |
| JP | 2010-151795 A | 7/2010 |
| JP | 2010-169460 A | 8/2010 |
| JP | 2011-075357 A | 4/2011 |
| JP | 2011-099757 A | 5/2011 |
| JP | 2012-163505 A | 8/2012 |
| JP | 2013-024654 A | 2/2013 |
| JP | 2013-036892 A | 2/2013 |
| JP | 2014-001968 A | 1/2014 |
| JP | 2014-0154683 | 7/2014 |
| JP | 2014-154712 | 7/2014 |
| JP | 2014-155049 | 7/2014 |
| JP | 2014-155049 A | 8/2014 |
| JP | 2015-232514 A | 12/2015 |
| WO | 2013/187253 A1 | 12/2013 |
| WO | 2016/017298 A1 | 2/2016 |

OTHER PUBLICATIONS

Communication Pursuant to Rule 114(2) EPC dated Apr. 29, 2019 for European Patent Application No. 15880071.4 (166 pages).
Communication Pursuant to Rule 114(2) EPC dated Apr. 29, 2019 for European Patent Application No. 15880071.4 (101 pages).
Extended European Search Report dated Aug. 22, 2018 for the European Patent Application No. 15880071.4.
Communication pursuant to Rule 114(2) EPC dated Aug. 16, 2018 directed to the EP counterpart application No. 15880071.4.
Communication pursuant to Rule 114(2) EPC dated Sep. 5, 2018 directed to the EP counterpart application No. 15880071.4.
Communication pursuant to Rule 114(2) EPC dated Dec. 3, 2018 directed to the EP counterpart application No. 15880071.4.
Communication pursuant to Rule 114(2) EPC dated May 3, 2019 directed to the EP counterpart application No. 15880071.4 (313 pages).
Chinese Office Action dated Feb. 11, 2019 for the Chinese Patent Application No. 201580068361.2.

* cited by examiner

FIG.10
(a)
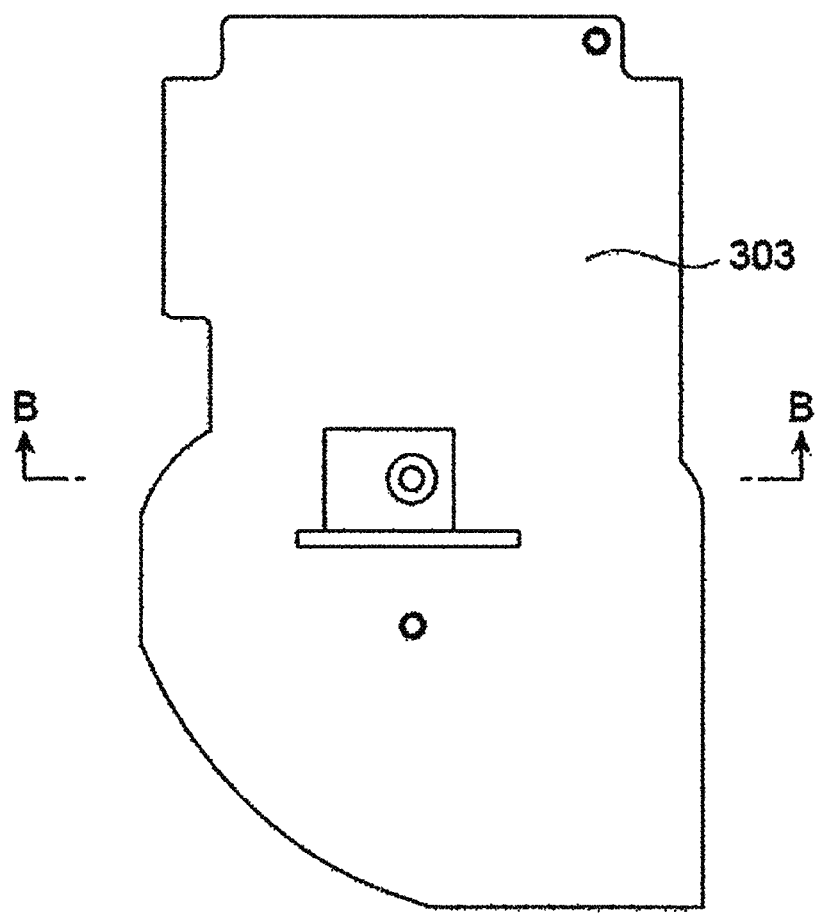
(b)
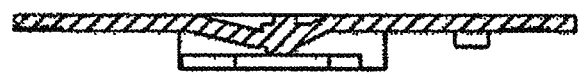

FIG.11
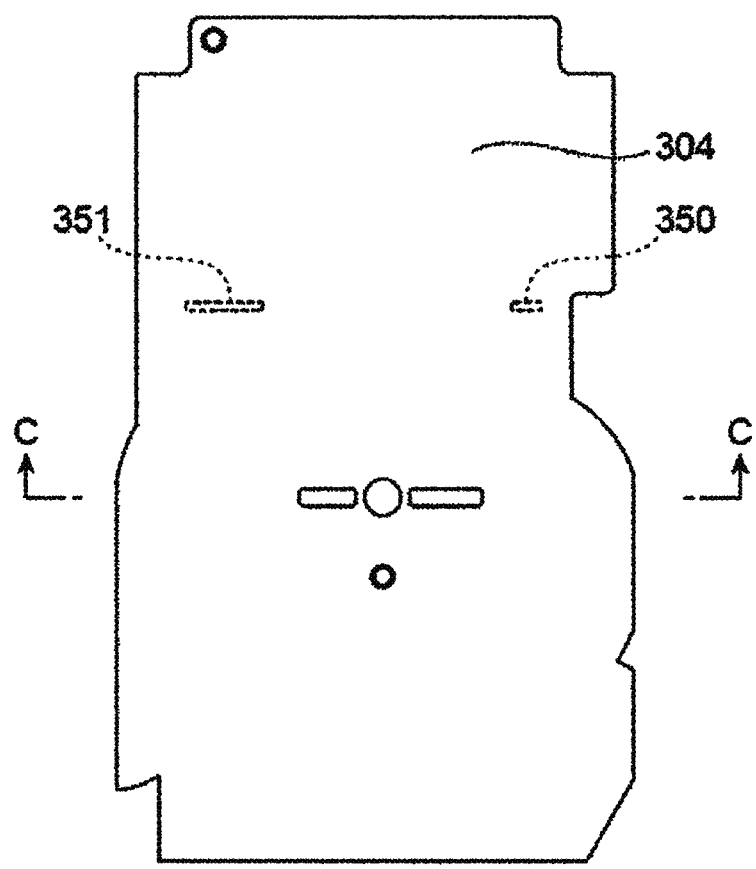
(a)
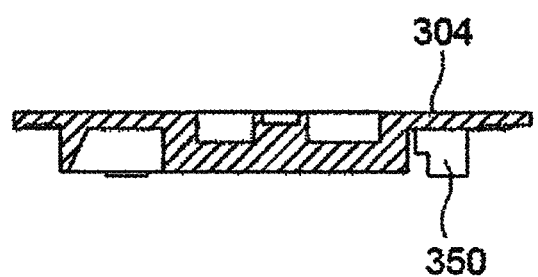
(b)

FIG.22
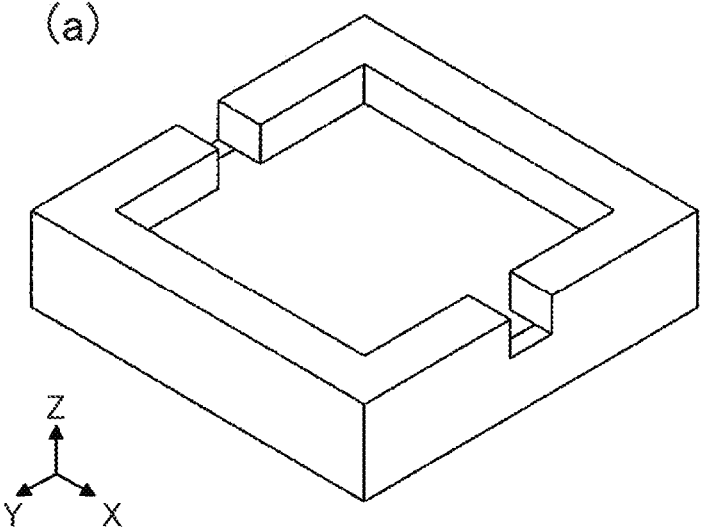
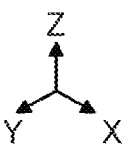
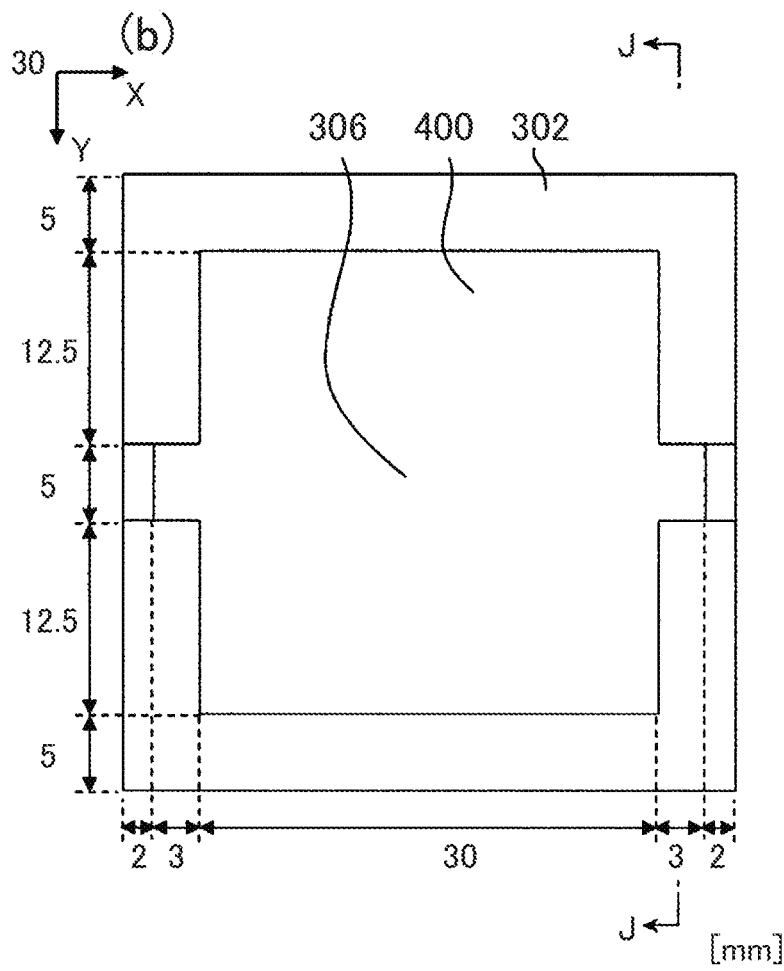
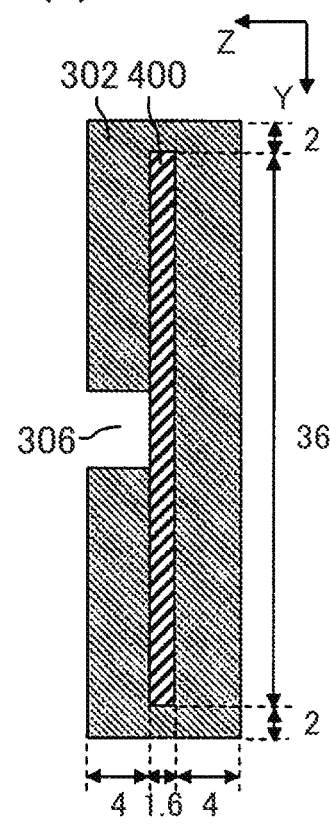

PHYSICAL QUANTITY DETECTION APPARATUS AND ELECTRONIC APPARATUS

TECHNICAL FIELD

The present invention relates to a physical quantity detection apparatus that detects the physical quantities of suction air in an internal combustion engine.

BACKGROUND ART

Regulations on fuel consumption, $CO_2$, and exhaust gas (mainly, nitrogen oxide (NOx) and particulate matter (PM)) have been stricter year after year in the field of automobiles, and a large number of new internal combustion engine controlling techniques for the future are being studied for achieving the regulations. Above all, physical quantity detection apparatuses used for various controls vary widely. Physical quantities, such as air, temperature, humidity, and pressure, in the suction pipe coupled to the combustion chamber of the internal combustion engine are particularly required to be exactly measured because they directly affect fuel consumption and exhaust gas, and the like.

The regulations on fuel consumption, $CO_2$, and exhaust gas are calculated and defined based on the driving cycle represented by the New European Driving Cycle (NEDC) of Europe. Not only the definition values, but also the driving cycle conditions and the regulation values of On-Board Diagnostic Systems (OBD), will be changed in the regulations.

Measurement of a mass flow rate, pressure, and temperature is typically employed at present in the physical quantity detection apparatus inserted into the suction pipe, but, with the above situation as a background, attention is being given, among the internal combustion engine controls, to the control using an absolute humidity (the water content in the air).

The water content in the air affects the flame propagation time in the combustion control of the internal combustion engine, so that for example, in the gasoline engine, such affecting worsens the combustion efficiency. In addition, in the diesel engine, such affecting is known to increase the amount of PM discharged with decreasing combustion temperature.

The absolute humidity herein represents the water content contained in the air (g (grams)/kg (kilograms)), and can be calculated according to the temperature, relative humidity, and pressure in the air. The relative humidity represents the rate (% (percent)) of the water content in the air.

As described above, temperature and pressure sensors have been long used in the field of automobiles, but are little known as a sensor for the relative humidity in the air flowing in the suction pipe. In the field of automobiles, it is now well-known that the humidity sensor is integrated with the air flow rate detection apparatus (see Patent Literatures 1 to 3).

The air flow rate detection apparatus in each of Patent Literatures 1 and 2 is integrated with the air flow rate sensor, the humidity sensor, and the pressure sensor. The air flow rate sensor is located in the sub-passage sucking the air flowing in the main air passage (or simply called the suction pipe), and is disposed on the terminal member formed of a metal material. The humidity sensor is located in the second sub-passage sucking the air flowing in the sub-passage, and is mounted on the electronic circuit substrate. Finally, the pressure sensor is disposed on the housing component. That is, each of the physical quantity detection sensors is disposed on each different member.

CITATION LIST

Patent Literature

Patent Literature 1: Japanese Unexamined Patent Application Publication No. 2010-43883
Patent Literature 2: Japanese Unexamined Patent Application Publication No. 2012-163505
Patent Literature 3: Japanese Unexamined Patent Application Publication No. 2013-36892

SUMMARY OF INVENTION

Technical Problem

Various technical improvements have been made in the field of automobiles to improve the exhaust gas regulations, safety, comfortability, and convenience, in addition to the vehicle basic performance. For such technical improvements, a wide variety of sensors are used. Consequently, the number of wire harnesses connecting the sensors and the engine control unit (hereinafter, the ECU) is increased, with the result that the physical quantity detection apparatus is complicated to have the problems of the cost and the space in the engine room. Therefore, the need for the physical quantity detection apparatus with which the sensors and the controller are integrated is growing now. By the integration, the decrease in the number of wire harnesses and size reduction can be expected.

Each of the air flow rate sensor, the pressure sensor, and the humidity sensor of the air flow rate detection apparatus with reference to Patent Literatures 1 to 3 is disposed on each different member in consideration of the performance of each of the sensors, but the size of the housing is susceptible to improvement.

First, the air flow rate detection apparatus is disposed in the suction pipe coupled to the combustion chamber of the internal combustion engine, and the measuring section of the housing in which the sensors are disposed is mounted to be exposed into the suction pipe. Due to this, the housing causes pressure loss with respect to the air in the suction pipe. That is, when the housing is increased in size, the pressure loss is increased to reduce the amount of the air admitted into the combustion chamber. The engine output is obtained by converting thermal energy by a chemical reaction between the fuel and the air to kinetic energy. Consequently, the reduction in the maximum air flow rate admitted into the combustion chamber due to the pressure loss leads to lowering of the engine output. Together with the maximum air flow rate, the increased pressure loss affects the minimum air flow rate that can be admitted into the combustion chamber. That is, due to the reduction in the bore diameter of the suction pipe with engine size reduction, extremely low flow rate measurement precision will be required for the air flow rate detection apparatus.

In the air flow rate detection apparatus, the flange and the connector that are formed integrally with the housing and are supported and fixed by the suction pipe are not exposed into the suction pipe, but are exposed into the engine room. The engine room is constituted of the hood and the vehicle body, and various engine components are disposed therein. Further space reduction will be contemplated due to the recent engine size reduction and pedestrian head protection standard. In such a situation, the housing size is required to be considered for integration of the sensors with the air flow rate detection apparatus.

The present invention has been made in view of the above points, and an object of the present invention is to provide a physical quantity detection apparatus that can reduce the outer shape of a housing in size.

Solution to Problem

To solve the above problems, the present invention adopts, for example, the configurations described in the claims.

The present invention provides a physical quantity detection apparatus that detects a plurality of physical quantities of gas to be measured flowing in a main passage, the apparatus having a housing disposed in the main passage, a circuit substrate insert molded in the housing, and a plurality of detection sensors each mounted on each of one face and the other face of the circuit substrate.

Advantageous Effects of Invention

According to the present invention, by disposing the plurality of physical quantity detection sensors by using both faces of the electronic circuit substrate, the circuit substrate can be reduced in size. That is, the size-reduced circuit substrate can reduce the housing of the physical quantity detection apparatus in size, thereby leading to securing of the space in the engine room and the reduction in the pressure loss in the suction pipe, which are problems. Other problems, configurations, and effects will be apparent from the description of the following embodiments.

BRIEF DESCRIPTION OF DRAWINGS

FIG. 10 are explanatory views of the configuration of the front cover.

FIG. 11 are explanatory views of the configuration of the rear cover.

FIG. 22 are analysis model diagrams of a second sub-passage that simulates an example illustrated in FIGS. 16 and 17.

DESCRIPTION OF EMBODIMENTS

Figure 1:
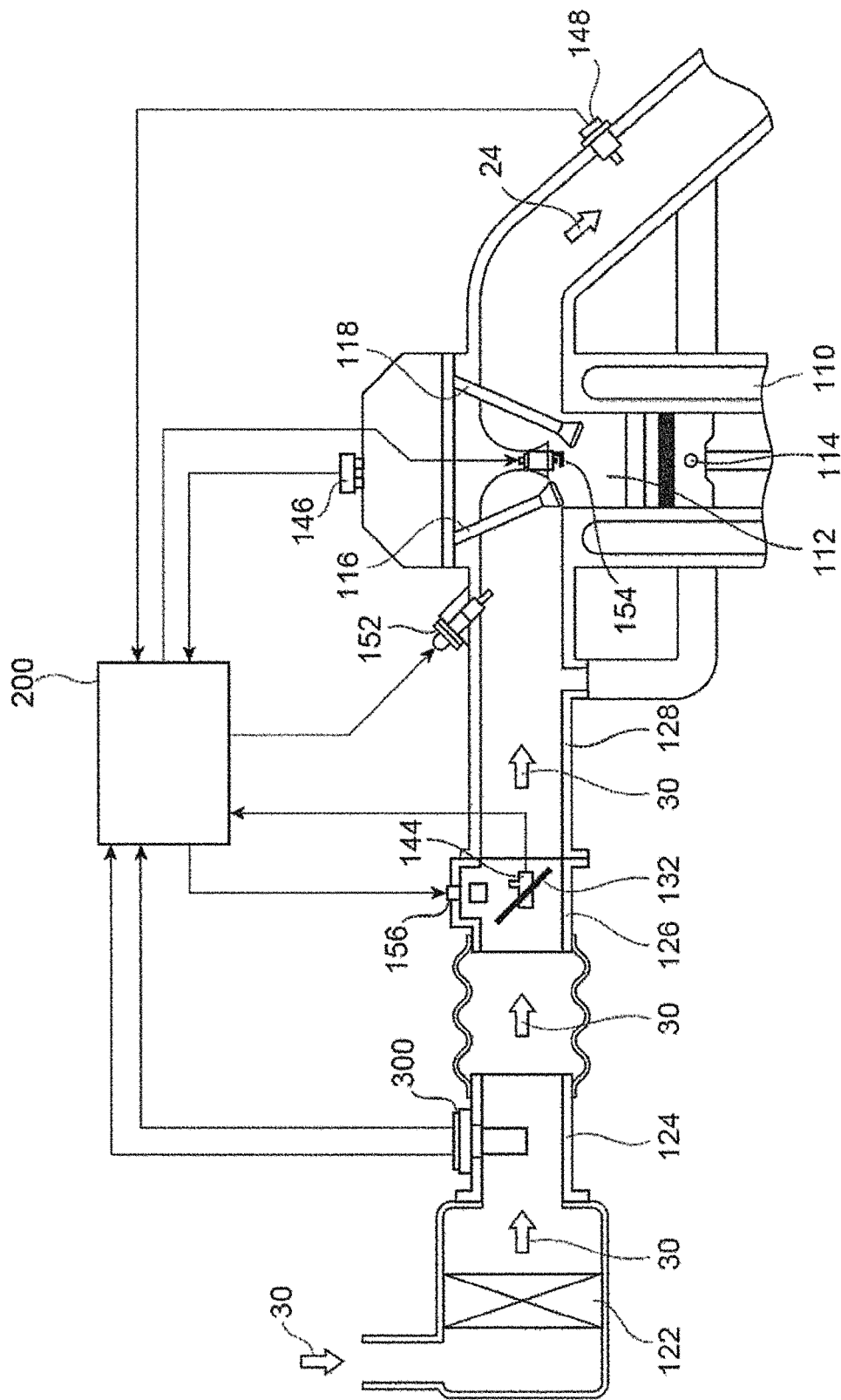
FIG. 1 is a system diagram illustrating an example in which a physical quantity detection apparatus according to the present invention is used in an internal combustion engine control system.

Embodiments (hereinafter, examples) described below solve various problems required for an actual product, and particularly solve various desirable problems and provide various effects in order to use the present invention as a detection apparatus that detects the physical quantities of suction air in a vehicle. One of the various problems solved by the following examples has the contents described in the section of Technical Problem, and one of the various effects provided by the following examples is the effect described in the section of Advantageous Effects of Invention. The various problems solved by the following examples and the various effects provided by the following examples will be described in the description of the following examples. Therefore, the contents of the problems solved by the following examples other than the contents in the section of Technical Problem and the effects provided by the following examples other than the effects in the section of Advantageous Effects of Invention will also be described in the following examples.

In the following examples, the same reference signs denote identical configurations throughout different drawings for providing the same operation and effect. Already described configurations are indicated by only the reference signs in the drawings, and the description thereof is sometimes omitted.

1. An Example in which a Physical Quantity Detection Apparatus According to the Present Invention is Used in an Internal Combustion Engine Control System FIG. 1 is a system diagram illustrating an example in which a physical quantity detection apparatus according to the present invention is used in an internal combustion engine control system of the electronic fuel injection type. Based on the operation of an internal combustion engine 110 including an engine cylinder 112 and an engine piston 114, suction air is sucked as gas 30 to be measured from an air cleaner 122, and is then led to the combustion chamber of the engine cylinder 112 through, for example, a suction body as a main passage 124, a throttle body 126, and a suction manifold 128.

The physical quantities of the gas 30 to be measured that is the suction air led to the combustion chamber are detected by a physical quantity detection apparatus 300 according to the present invention, and fuel is supplied from a fuel injection valve 152 based on the detected physical quantities, and is then led to the combustion chamber in a fuel-air mixture state together with suction air 20. It is noted that in this example, the fuel injection valve 152 is disposed in the suction port of the internal combustion engine, the fuel injected into the suction port forms the fuel-air mixture together with the gas 30 to be measured that is the suction air, and the fuel-air mixture is led through a suction valve 116 to the combustion chamber, and is then combusted to generate mechanical energy.

Many recent automobiles employ, as a system excellent in exhaust gas purification and fuel consumption improvement, a system in which the fuel injection valve 152 is mounted in the cylinder head of the internal combustion engine, and directly injects the fuel from the fuel injection valve 152 into each combustion chamber. The physical quantity detection apparatus 300 can be used, not only in the system illustrated in FIG. 1 in which the fuel is injected into the suction port of the internal combustion engine, but also in the system in which the fuel is directly injected to each combustion chamber. Both systems have substantially the same basic concept in the control parameter measuring method including the using method of the physical quantity detection apparatus 300 and the internal combustion engine controlling method including the amount of the fuel supplied and ignition timing. As a representative example of both systems, the system in which the fuel is injected into the suction port is illustrated in FIG. 1.

The fuel and air led to the combustion chamber form the fuel-air mixture state to be combusted explosively by spark ignition of an ignition plug 154, thereby generating the mechanical energy. The combusted gas is led from an exhaust valve 118 to an exhaust pipe, and is then exhausted as exhaust gas 24 from the exhaust pipe to the outside of the vehicle. The flow rate of the gas 30 to be measured that is the suction air led to the combustion chamber is controlled by a throttle valve 132 whose opening is changed based on the operation of an accelerator pedal. The amount of the fuel supplied is controlled based on the flow rate of the suction air led to the combustion chamber, and the driver controls the opening of the throttle valve 132 to control the flow rate of the suction air led to the combustion chamber, thereby controlling the mechanical energy generated by the internal combustion engine.

1.1 An Overview of the Control of the Internal Combustion Engine Control System

The physical quantities, such as the flow rate, temperature, humidity, and pressure of the gas 30 to be measured that is the suction air sucked from the air cleaner 122 and flowing in the main passage 124 are detected by the physical quantity detection apparatus 300, and electric signals representing the physical quantities of the suction air are input from the physical quantity detection apparatus 300 to a controller 200. In addition, the output of a throttle angle sensor 144 measuring the opening of the throttle valve 132 is input to the controller 200. Further, the output of a rotation angle sensor 146 is input to the controller 200 to measure the positions and states of the engine piston 114, the suction valve 116, and the exhaust valve 118 of the internal combustion engine and the rotation speed of the internal combustion engine. The output of an oxygen sensor 148 is input to the controller 200 to measure the state of the mixing ratio between the amount of the fuel and the amount of the air from the state of the exhaust gas 24.

The controller 200 computes the amount of the fuel injected and the ignition timing based on the physical quantities of the suction air that are the outputs of the physical quantity detection apparatus 300 and the rotation speed of the internal combustion engine measured based on the output of the rotation angle sensor 146. Based on these computation results, the amount of the fuel supplied from the fuel injection valve 152 and the ignition timing of ignition by the ignition plug 154 are controlled. Actually, the amount of the fuel supplied and the ignition timing are further finely controlled based on the changed state of the temperature detected by the physical quantity detection apparatus 300 and the throttle angle, the changed state of the engine rotation speed, and the state of the air-fuel ratio measured by the oxygen sensor 148. In the idle operation state of the internal combustion engine, the controller 200 further controls the amount of the air bypassing the throttle valve 132 by an idle air control valve 156 to control the rotation speed of the internal combustion engine in the idle operation state.

1.2 The Importance of Detection Precision Improvement of the Physical Quantity Detection Apparatus and Environments in which the Physical Quantity Detection Apparatus is Mounted Both the amount of the fuel supplied and the ignition timing that are the main control amounts of the internal combustion engine are computed with the outputs of the physical quantity detection apparatus 300 as main parameters. Thus, detection precision improvement, using change prevention, and reliability improvement of the physical quantity detection apparatus 300 are important for control precision improvement and reliability securing of the vehicle.

In particular, the demand for vehicle fuel saving has been very high, and the demand for exhaust gas purification has also been very high. To respond to these demands, it is very important to improve the detection precision of the physical quantities of the suction air 20 detected by the physical quantity detection apparatus 300. In addition, it is important that the physical quantity detection apparatus 300 maintains high reliability.

The vehicle on which the physical quantity detection apparatus 300 is mounted is used in an environment in which temperature change is large, and is also used in wind, rain, and snow. When running on a snowy road, the vehicle runs on the road on which an anti-freezing agent is sprayed. The physical quantity detection apparatus 300 is desirably considered to respond to temperature change in an environment in which it is used and to respond to dust and contaminants, and the like. Further, the physical quantity detection apparatus 300 is installed in an environment in which it is vibrated by the internal combustion engine. The physical quantity detection apparatus 300 is required to maintain high reliability with respect to vibration.

In addition, the physical quantity detection apparatus 300 is mounted in the suction pipe affected by heat generated from the internal combustion engine. Thus, the heat generated from the internal combustion engine is transmitted to the physical quantity detection apparatus 300 through the suction pipe that is the main passage 124. Since the physical quantity detection apparatus 300 detects the flow rate of the gas to be measured by heat transmission with the gas to be measured, it is important to minimize the influence of the heat from the outside.

As described below, the physical quantity detection apparatus 300 mounted on the automobile solves the problems described in the section of Technical Problem, and provides the effects described in the section of Advantageous Effects of Invention, and besides, as described below, the physical quantity detection apparatus 300 sufficiently considers the above problems, solves the various problems required to be solved for the product, and provides the various effects. The specific problems solved by the physical quantity detection apparatus 300 and the specific effects provided by the physical quantity detection apparatus 300 will be described in the description of the following examples.

2. The Configuration of the Physical Quantity Detection Apparatus 300

2.1 The Appearance Configuration of the Physical Quantity Detection Apparatus 300

Figure 2:
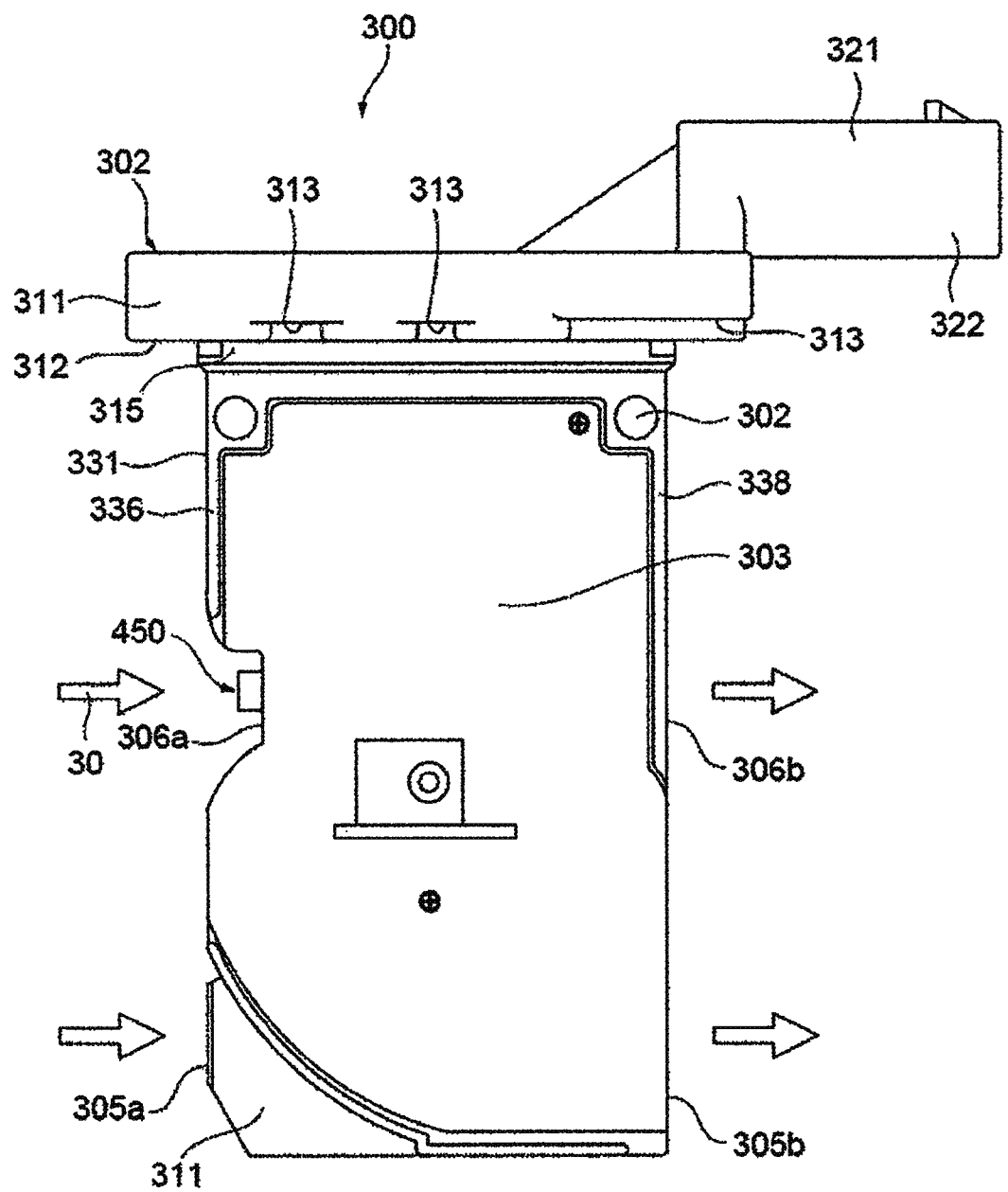
FIG. 2 is a front view of the physical quantity detection apparatus.
Figure 3:
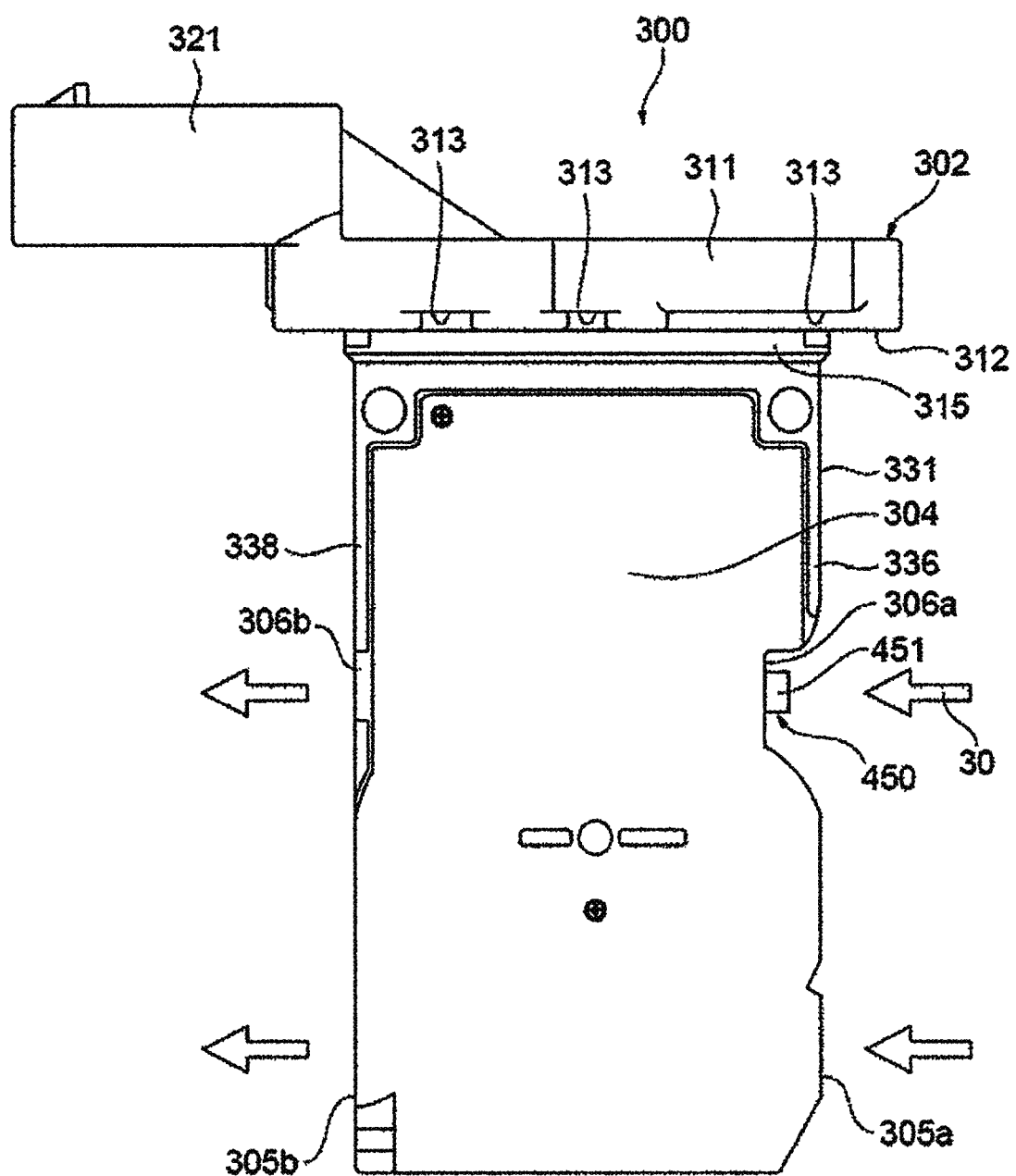
FIG. 3 is a rear view of the physical quantity detection apparatus.
Figure 4:
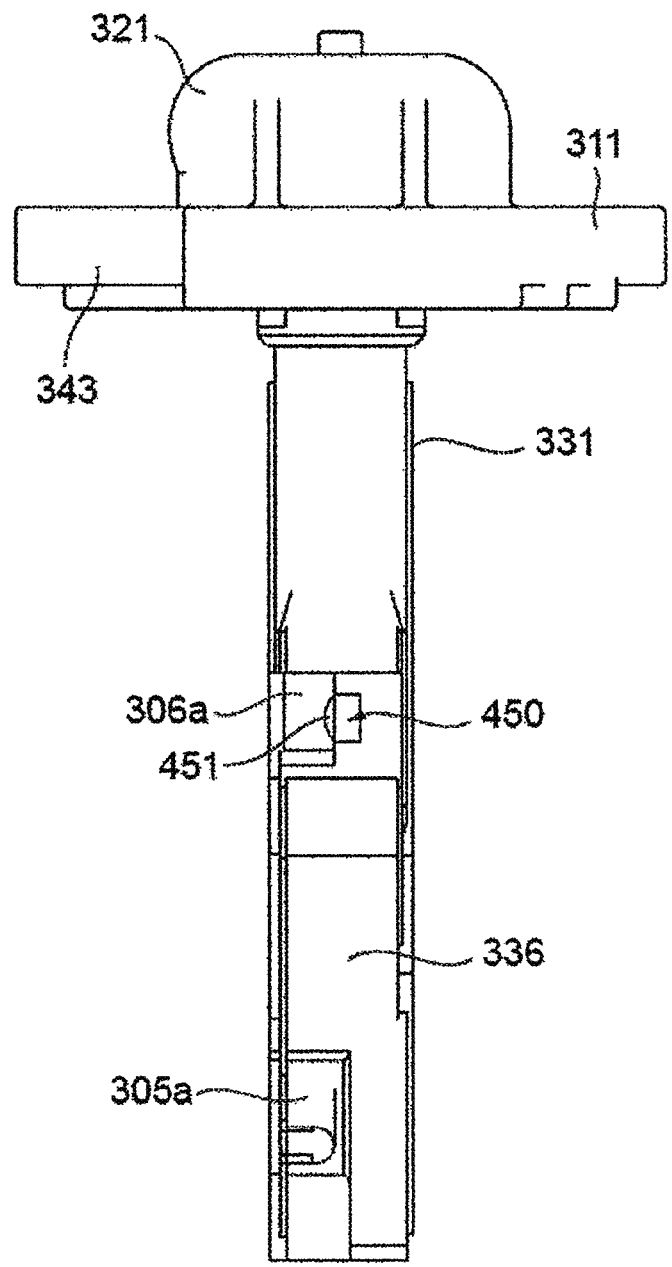
FIG. 4 is a left side view of the physical quantity detection apparatus.
Figure 5:
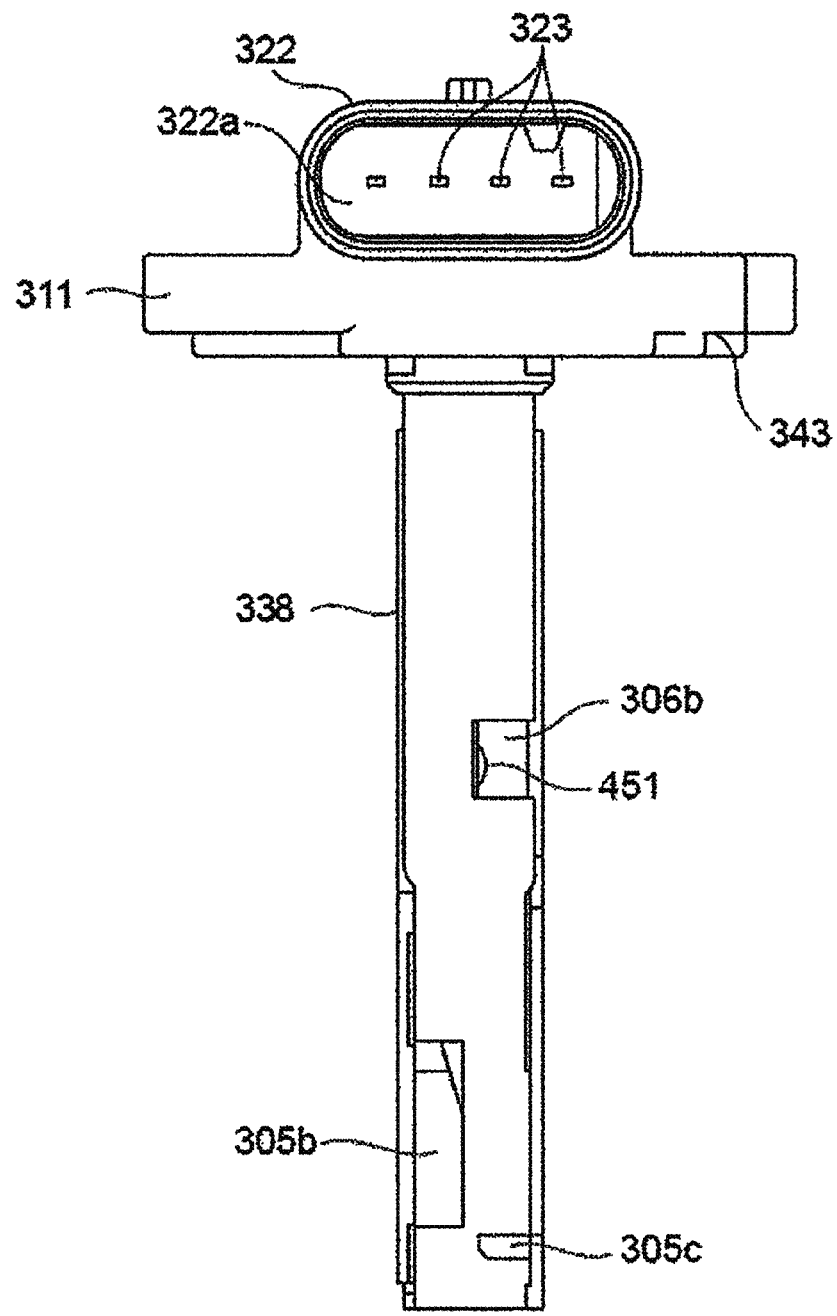
FIG. 5 is a right side view of the physical quantity detection apparatus.
Figure 6:
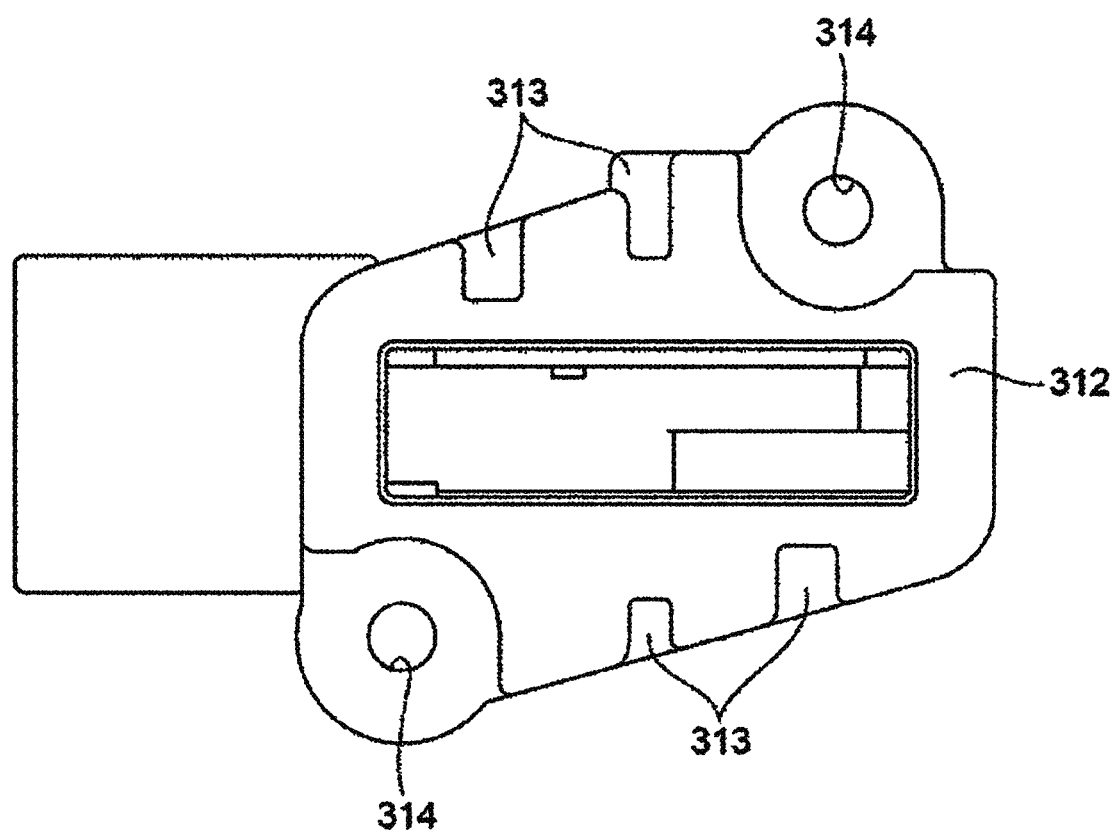
FIG. 6 is a bottom view of the physical quantity detection apparatus.

FIGS. 2 to 6 are diagrams illustrating the appearance of the physical quantity detection apparatus 300, in which FIG. 2 is a front view of the physical quantity detection apparatus 300, FIG. 3 is a rear view thereof, FIG. 4 is a left side view thereof, FIG. 5 is a right side view thereof, and FIG. 6 is a bottom view thereof.

The physical quantity detection apparatus 300 includes, as housing components, a housing 302, a front cover 303, and a rear cover 304. The housing 302 has a flange 311 for fixing the physical quantity detection apparatus 300 to the suction body that is the main passage 124, an external connecting section 321 having a connector protruding from the flange 311 to the outside for electric connection to an external device, and a measuring section 331 extending to protrude from the flange 311 toward the center of the main passage 124.

Figure 7:
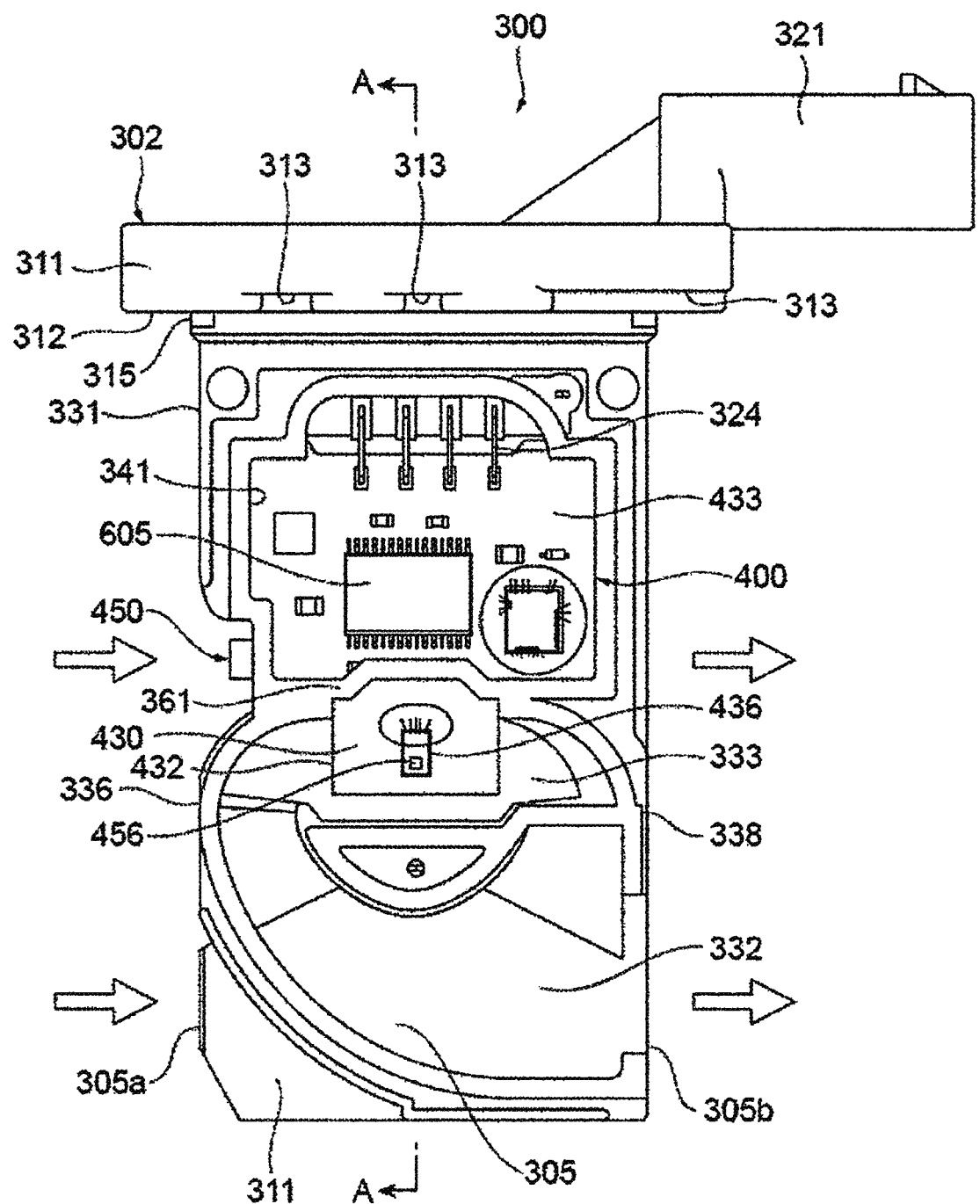
FIG. 7 is a front view illustrating the physical quantity detection apparatus from which a front cover is removed.
Figure 8:
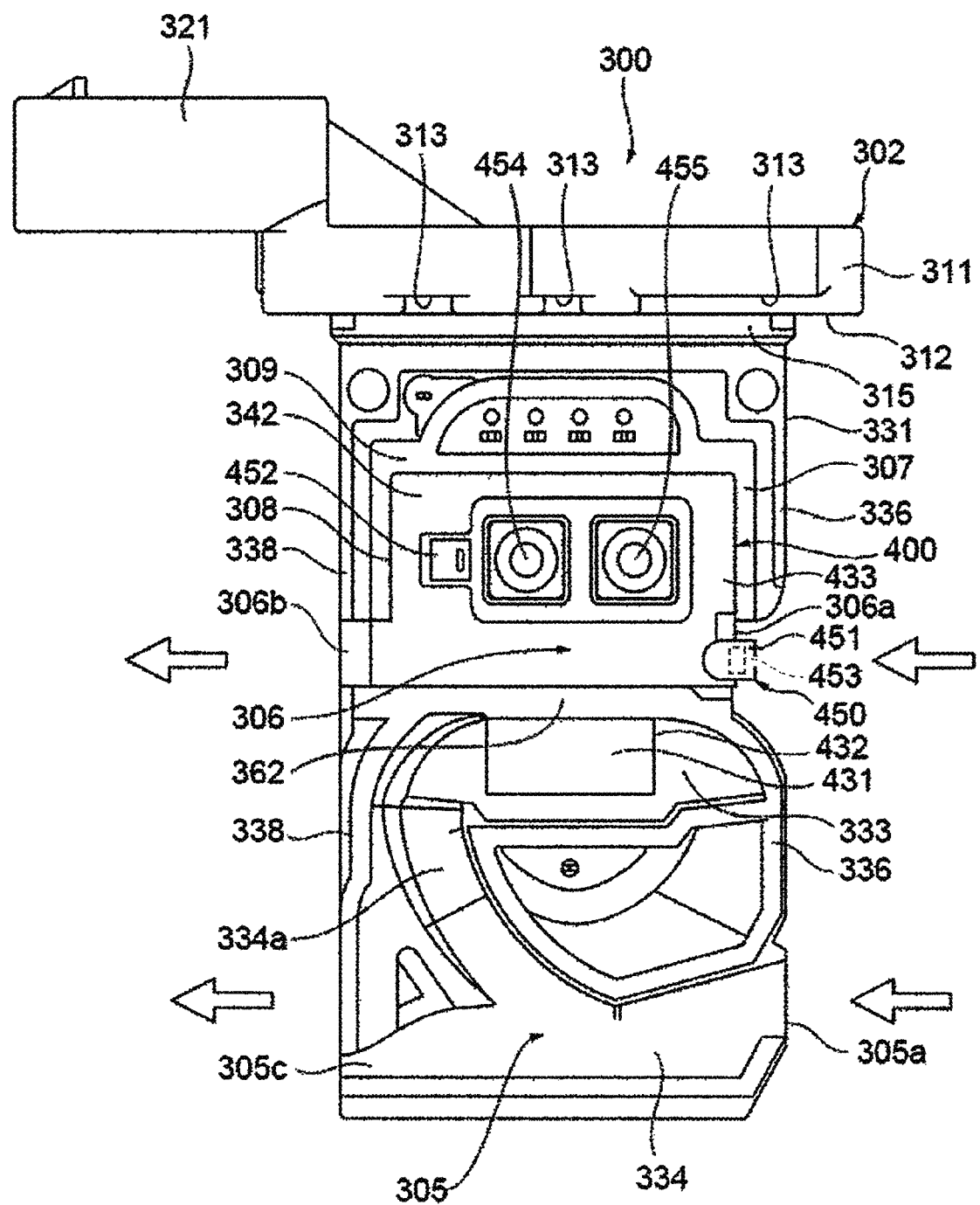
FIG. 8 is a rear view illustrating the physical quantity detection apparatus from which a rear cover is removed.

The measuring section 331 is formed integrally with a circuit substrate 400 by insert molding (see FIGS. 7 and 8). The circuit substrate 400 has a plurality of detecting sections for detecting various physical quantities of the gas 30 to be measured flowing in the main passage 124, and a circuit for processing signals detected by these detecting sections.

In the front face and the rear face of the measuring section 331, sub-passage grooves are disposed in such a manner that a first sub-passage 305 is formed in cooperation with the front cover 303, and that a second sub-passage 306 is formed in cooperation with the rear cover 304 (see FIGS. 7 and 8). At the distal end of the measuring section 331, a first sub-passage inlet 305a and a first sub-passage outlet 305b are disposed. The first sub-passage inlet 305a sucks part of the gas 30 to be measured, such as the suction air, into the first sub-passage 305. The first sub-passage outlet 305b returns the gas 30 to be measured from the first sub-passage 305 into the main passage 124.

At the intermediate portion of the measuring section 331 on the flange 311 side from the first sub-passage 305, a second sub-passage inlet 306a and a second sub-passage outlet 306b are disposed. The second sub-passage inlet 306a sucks part of the gas 30 to be measured, such as the suction air, into the second sub-passage 306. The second sub-passage outlet 306b returns the gas 30 to be measured from the second sub-passage 306 into the main passage 124. In the middle of the first sub-passage 305, a flow rate detecting section 456 constituting one of the detecting sections (see FIG. 7) is disposed, thereby detecting the flow rate of the gas 30 to be measured. The second sub-passage 306 has a passage straightly connecting the second sub-passage inlet and the second sub-passage outlet, and a sensor chamber 342 communicating with the passage and in which the detection sensors are disposed (see FIG. 8). The sensor chamber 342 accommodates pressure sensors 454 and 455 and a temperature and humidity sensor 452 as the detecting sections disposed on the rear face of the circuit substrate 400 and detecting the physical quantities different from the flow rate.

2.2 The Effect Based on the Appearance Configuration of the Physical Quantity Detection Apparatus 300

In the physical quantity detection apparatus 300, the second sub-passage inlet 306a is disposed at the intermediate portion of the measuring section 331 extending from the flange 311 toward the center of the main passage 124, and the first sub-passage inlet 305a is disposed at the distal end of the measuring section 331. Thus, the gas in the portion near the center spaced from the inner wall surface of the main passage 124, not near the inner wall surface of the main passage 124, can be sucked into each of the first sub-passage 305 and the second sub-passage 306.

Thus, the physical quantity detection apparatus 300 can measure the physical quantities of the gas in the portion spaced from the inner wall surface of the main passage 124, and can prevent lowering of the measurement precision due to the influence of the heat. Near the inner wall surface of the main passage 124, the gas 30 to be measured is likely to be affected by the temperature of the main passage 124, so that the gas 30 to be measured has a temperature different from the original temperature of the gas, and is different from the average state of the main gas in the main passage 124. In particular, when the main passage 124 is the suction body of the engine, it is affected by the heat from the engine, and is often maintained at high temperature. Thus, the gas near the inner wall surface of the main passage 124 often has a higher temperature than the original temperature in the main passage 124, thereby lowering the measurement precision.

The fluid resistance near the inner wall surface of the main passage 124 is high, so that the flow speed near the inner wall surface of the main passage 124 is lower than the average flow speed in the main passage 124. Thus, when the gas near the inner wall surface of the main passage 124 is sucked as the gas 30 to be measured into the first sub-passage 305 and the second sub-passage 306, the flow speed near the inner wall surface of the main passage 124 lower than the average flow speed in the main passage 124 can lead to measurement error of the physical quantities. Thus, in the first sub-passage 305 in which the flow rate detecting section is disposed, the first sub-passage inlet 305a is disposed at the distal end of the measuring section 331 that is thin and long and extending from the flange 311 toward the center of the main passage 124.

Meanwhile, in the second sub-passage 306, the second sub-passage inlet 306a is disposed at the intermediate portion of the measuring section 331, and the humidity detecting section and the pressure detecting sections that can measure the physical quantities regardless of the lowered flow speed near the inner wall surface are disposed. In addition, the first sub-passage 305 has the first sub-passage outlet 305b disposed at the distal end of the measuring section 331, and the second sub-passage outlet 306b is disposed at the intermediate portion of the measuring section 331, thereby constituting the respective independent sub-passages, so that the flow speed necessary for each detecting section can be secured to reduce measurement error.

The measuring section 331 has a shape extending long along the axis from the outer wall of the main passage 124 toward the center of the main passage 124, and has a narrow width, as illustrated in FIGS. 4 and 5. That is, the measuring section 331 of the physical quantity detection apparatus 300 has thin side faces, and a substantially rectangular front face. With this, the physical quantity detection apparatus 300 can include the sufficiently long sub-passages, and can reduce the fluid resistance to the gas 30 to be measured to a small value. Thus, the physical quantity detection apparatus 300, which can reduce the fluid resistance to a small value, can measure the flow rate of the gas 30 to be measured with high precision.

2.3 The Configuration of a Temperature Detection Section 451

The temperature detecting section 451 constitutes one of the detecting sections for detecting the physical quantities of the gas 30 to be measured flowing in the main passage 124, and is disposed on the circuit substrate 400. The circuit substrate 400 has a tongue 450 protruding from the second sub-passage inlet 306a of the second sub-passage 306 toward the upstream of the gas 30 to be measured, and the temperature detecting section 451 is disposed at the tongue 450 and on the rear face of the circuit substrate 400. The temperature detecting section 451 has a chip-type temperature sensor 453. The temperature sensor 453 and its wiring portion are covered with a synthetic resin material, which prevents electrolytic corrosion due to salt water adherence from occurring. The synthetic resin material in a melted state is coated onto the rear face of the tongue 450, and is solidified after the coating to cover the temperature sensor 453, and the like.

For example, as illustrated in FIG. 8, at the center of the measuring section 331 in which the second sub-passage inlet 306a is disposed, an upstream side outer wall 336 in the measuring section 331 constituting the housing 302 is recessed toward the downstream side, and the tongue 450 of the circuit substrate 400 protrudes from the recessed upstream side outer wall 336 toward the upstream side. The distal end of the tongue 450 is disposed at the position recessed from the face of the upstream side outer wall 336 on the most upstream side. The temperature detecting section 451 is disposed on the rear face side of the circuit substrate 400, that is, on the second sub-passage 306 side and on the upstream side thereof.

Since the second sub-passage inlet 306a is formed to continue to the downstream side of the temperature detecting section 451, the gas 30 to be measured flowing from the second sub-passage inlet 306a into the second sub-passage 306 comes into contact with the temperature detecting section 451 to flow into the second sub-passage inlet 306a, and the temperature of the gas 30 to be measured is detected when the gas 30 to be measured comes into contact with the temperature detecting section 451. The gas 30 to be measured that comes into contact with the temperature detecting section 451 directly flows from the second sub-passage inlet 306a into the second sub-passage 306, passes in the second sub-passage 306, and is discharged from the second sub-passage outlet 306b into the main passage 124.

2.4 The Effect Related to the Temperature Detecting Section 451

The temperature of the gas 30 to be measured flowing from the upstream side in the direction along the flow of the gas into the second sub-passage inlet 306a is measured by the temperature detecting section 451, and further, the gas flows from the distal end portion of the tongue 450 toward the base end portion of the tongue 450 to cool the base end portion of the tongue 450 in the direction in which the temperature of the base end portion of the tongue 450 is close to the temperature of the gas 30 to be measured. The temperature of the suction pipe that is the main passage 124 usually becomes high, and the heat is transmitted to the base end portion of the tongue 450 from the flange 311 or an abutting section 315 through the upstream side outer wall 336 in the measuring section 331 or the circuit substrate 400, which can affect the temperature measurement precision of the temperature detecting section 451. As described above, the gas 30 to be measured is measured by the temperature detecting section 451, and then flows along the base end portion of the tongue 450 to cool the base end portion of the tongue 450. This can prevent the heat from being transmitted to the base end portion of the tongue 450 from the flange 311 or the abutting section 315 through the upstream side outer wall 336 in the measuring section 310 or the circuit substrate 400.

In particular, the upstream side outer wall 336 in the measuring section 331 is recessed toward the downstream side at the base end portion of the tongue 450 (FIGS. 7 and 8), so that the length of the upstream side outer wall 336 from the flange 311 to the base end portion of the tongue 450 can be increased, the heat conduction distance from the flange 311 and the abutting section 315 can be increased, and the distance to the portion cooled by the gas 30 to be measured can be increased. Thus, the influence of the heat given by the flange 311 or the abutting section 315 can be reduced. In addition, for example, in the operation of mounting the physical quantity detection apparatus 300 in the main passage 124, the tongue 450 cannot be an obstacle when the measuring section 331 is inserted into the main passage 124 from a mounting hole provided in the main passage 124, so that the tongue 450 can be prevented from hitting the main passage 124, and the like, thereby protecting from damage.

2.5 The Configuration and Effect of the Flange 311

The flange 311 has a plurality of recesses 313 in a lower face 312 facing the main passage 124, which reduce the heat conduction face between the flange 311 and the main passage 124 so that the physical quantity detection apparatus 300 is unlikely to be affected by the influence of the heat. In the physical quantity detection apparatus 300, the measuring section 331 is inserted into the main passage 124 from the mounting hole provided in the main passage 124, so that the lower face 312 of the flange 311 faces the main passage 124. The main passage 124 is, for example, the suction body, and is often maintained at high temperature. On the contrary, at the start-up in a cold area, the main passage 124 is assumed to have a very low temperature. When such high and low temperature states of the main passage 124 affect the temperature detecting section 451 and later-described flow rate measurement, the measurement precision is lowered. Since the flange 311 has the recesses 313 in the lower face 312, a space is defined between the lower face 312 facing the main passage 124 and the main passage 124. Thus, the heat transmission from the main passage 124 to the physical quantity detection apparatus 300 is reduced, thereby preventing lowering of the measurement precision due to the heat.

Screw holes 314 in the flange 311 fix the physical quantity detection apparatus 300 to the main passage 124, and a space is defined between the face of the flange 311 facing the main passage 124 around the screw holes 314 and the main passage 124 so that the face of the flange 311 facing the main passage 124 around the screw holes 314 is located away from the main passage 124. Thus, the heat transmission from the main passage 124 to the physical quantity detection apparatus 300 can be reduced, thereby preventing lowering of the measurement precision due to the heat.

Further, the recesses 313 have, not only the effect of reducing the heat conduction, but also the effect of reducing the influence of shrinkage of the resin constituting the flange 311 during molding of the housing 302. The flange 311 has a larger resin thickness than the measuring section 331. When during the resin molding of the housing 302, the resin is cooled from the high temperature state to the low temperature state and is cured, and thus volume shrinkage occurs to cause distortion due to stress occurrence. By molding the recesses 313 in the flange 311, the volume shrinkage can be equalized more, thereby reducing stress concentration.

The measuring section 331 is inserted into the main passage 124 from the mounting hole provided in the main passage 124, and is fixed to the main passage 124 with screws by the flange 311 of the physical quantity detection apparatus 300. The physical quantity detection apparatus 300 is desirably fixed into the mounting hole provided in the main passage 124 at the predetermined position. The recesses 313 disposed in the flange 311 can be used for positioning the main passage 124 and the physical quantity detection apparatus 300. By molding convex portions in the main passage 124, the convex portions can be fit into the recesses 313, so that the physical quantity detection apparatus 300 can be fixed to the main passage 124 at the correct position.

2.6 The Configuration of the External Connection Section 321

The external connecting section 321 has a connector 322 disposed on the upper face of the flange 311 and protruding from the flange 311 to the downstream side in the flow direction of the gas 30 to be measured. The connector 322 has an insertion hole 322a for inserting a communication cable connecting between the external connecting section 321 and the controller 200. As illustrated in FIG. 5, four external terminals 323 are disposed inside the insertion hole 322a. The external terminals 323 are terminals for outputting information of the physical quantities as the measurement results of the physical quantity detection apparatus 300 and power supply terminals for supplying direct current electric power for operating the physical quantity detection apparatus 300. In this embodiment, the connector 322 protrudes from the flange 311 to the downstream side in the flow direction of the gas 30 to be measured, and is inserted from the downstream side to the upstream side in the flow direction, but the connector 322 is not limited to this shape, and various changes can be made, for example, in such a manner that the connector 322 may protrude perpendicularly from the upper face of the flange 311, and be inserted along the extending direction of the measuring section 331.

Figure 9:
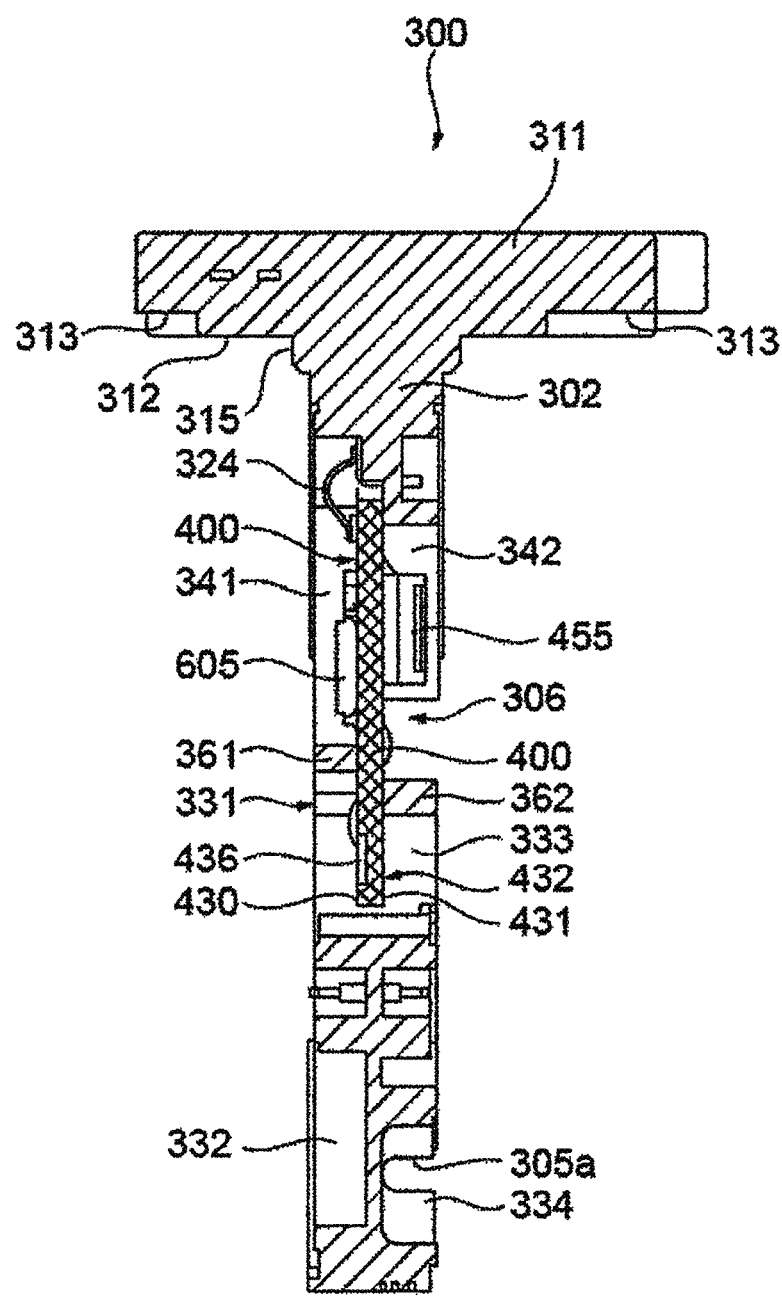
FIG. 9 is a cross-sectional view taken in the direction of arrow A-A of FIG. 7.

3. The Overall Configuration of the Housing 302 and the Effect thereof 3.1 The Configuration and Effect of the Sub-Passages and the Flow Rate Detecting Section FIGS. 7 to 9 illustrate the states of the housing 302 when the front cover 303 and the rear cover 304 are removed from the physical quantity detection apparatus 300. FIG. 7 is a front view of the housing 302, FIG. 8 is a rear view of the housing 302, and FIG. 9 is a cross-sectional view taken along line A-A of FIG. 7.

In the housing 302, the measuring section 331 extends from the flange 311 toward the center of the main passage 124, the circuit substrate 400 is disposed on the base end side of the measuring section 331, and the sub-passage groove for forming the first sub-passage 305 is disposed on the distal end side of the measuring section 331.

The circuit substrate 400 has a planar shape, and has a main body 433 that is substantially rectangular in planar view and partitions the base end of the measuring section 331 into the front face side and the rear face side, and a protrusion 432 that protrudes from one side of the main body 433 and is disposed in the first sub-passage 305.

As illustrated in FIGS. 7 and 8, the circuit substrate 400 is disposed along the plane of the measuring section 331, and as illustrated in FIG. 9, is disposed in parallel along the face of the measuring section 331 to partition the base end of the measuring section 331 into the front face side and the rear face side at the intermediate position between the front face and the rear face of the measuring section 331.

The flow rate detecting section 456 that is the air flow rate sensor is disposed on the front face (one face) of the circuit substrate 400 that is the same as the mounting face on which a circuit component, such as a microprocessor (hereinafter, called a microcomputer), is mounted, and at least one of the physical quantity detection sensors (for example, the humidity sensor and the pressure sensors) is disposed on the rear face (the other face) of the circuit substrate 400. That is, the circuit substrate 400 has, on its front face, a detection sensor face region in which the flow rate detecting section 456 that is the physical quantity detection sensor is disposed, and a circuit component face region in which the circuit component, such as an LSI, other than the physical quantity detection sensor, is disposed. The circuit substrate 400 has, on its rear face, an opposite face region facing the circuit component face region, and at least part of the opposite face region on the rear face of the circuit substrate is exposed to the second sub-passage 306.

In this example, the circuit components to be wire bonded, such as the LSI and the air flow rate sensor, are disposed on the front face of the circuit substrate 400, and the circuit components to be soldered, such as the temperature and humidity sensor 452 and the pressure sensors 454 and 455, are disposed on the rear face of the circuit substrate 400. In this way, by disposing the circuit components to be wire bonded on one face of the circuit substrate 400, the circuit substrate 400 can be easily manufactured.

On the front face side of the measuring section 331, a circuit chamber 341 accommodating the circuit components, such as the LSI and the microcomputer, mounted on the front face of the circuit substrate 400 is formed. The circuit chamber 341 is sealed in cooperation with the front cover 303 to be completely separated from the outside.

The second sub-passage 306 is formed by the circuit substrate 400 on the rear face side thereof. The second sub-passage 306 is formed in cooperation with the rear cover 304. The second sub-passage 306 has the passage straightly extending along the flow direction of the gas 30 to be measured flowing in the main passage 124, and the sensor chamber 342 formed at the position biased from the passage in the direction orthogonal to or crossing the flow direction of the gas 30 to be measured. The sensor chamber 342 defines a predetermined interior space in which the rear face side is closed by the rear cover 304, and communicates with the outside through the second sub-passage 306 continuously formed to the distal end side of the measuring section 331. The sensor chamber 342 accommodates the pressure sensors 454 and 455 and the temperature and humidity sensor 452 mounted on the rear face of the circuit substrate 400.

The sub-passage groove for forming the first sub-passage 305 has a front side sub-passage groove 332 illustrated in FIG. 7, and a rear side sub-passage groove 334 illustrated in FIG. 8. The front side sub-passage groove 332 is gradually curved to the flange 311 side that is the base end side of the measuring section 331 as it shifts from the first sub-passage outlet 305b opened to a downstream side outer wall 338 in the measuring section 331 toward the upstream side outer wall 336 in the measuring section 331, and communicates with an opening 333 at the position near the upstream side outer wall 336. The opening 333 is formed to penetrate through the measuring section 331 in the thickness direction. The opening 333 is formed along the flow direction of the gas 30 to be measured in the main passage 124 to extend between the upstream side outer wall 336 and the downstream side outer wall 338.

In the opening 333, the protrusion 432 that is part of the circuit substrate 400 is disposed. The protrusion 432 of the circuit substrate 400 penetrates through partitioning walls 361 and 362 partitioning the circuit chamber 341 of the measuring section 331 and the second sub-passage 306, and protrudes to the opening 333. The protrusion 432 has a measuring flow path face 430 and a rear face 431 thereof to extend in parallel along the flow direction of the gas 30 to be measured in the opening 333.

The rear side sub-passage groove 334 shifts from the first sub-passage inlet 305a opened to the upstream side outer wall 336 in the measuring section 331 toward the downstream side outer wall 338 in the measuring section 331, and is biforked at the intermediate position between the upstream side outer wall 336 and the downstream side outer wall 338, so that one biforked rear side sub-passage groove 334 directly straightly extends as a discharge passage and communicates with a discharge port 305c opened to the downstream side outer wall 338, and that the other biforked rear side sub-passage groove 334 is gradually curved to the flange 311 side that is the base end side of the measuring section 331 as it shifts to the downstream side outer wall 338, and communicates with the opening 333 at the position near the downstream side outer wall 338.

The rear side sub-passage groove 334 forms the inlet groove of the first sub-passage 305 into which the gas 30 to be measured flows from the main passage 124, and the front side sub-passage groove 332 forms the outlet groove of the first sub-passage 305 returning the gas 30 to be measured sucked from the rear side sub-passage groove 334 into the main passage 124. The front side sub-passage groove 332 and the rear side sub-passage groove 334 are disposed on the distal end side of the measuring section 331, so that the gas in the portion spaced from the inner wall surface of the main passage 124, that is, the gas flowing in the portion near the center portion of the main passage 124, can be sucked as the gas 30 to be measured. The gas flowing near the inner wall surface of the main passage 124 is affected by the wall surface temperature of the main passage 124, and often has a temperature that is different from the average temperature of the gas flowing in the main passage 124, such as the gas 30 to be measured. In addition, the gas flowing near the inner wall surface of the main passage 124 tends to exhibit a flow speed that is lower than the average flow speed of the gas flowing in the main passage 124. The physical quantity detection apparatus 300 of the example is insusceptible to such influence, and can prevent lowering of the measurement precision.

In this example, the sub-passage grooves 332 and 334 for molding the first sub-passage 305 are disposed in the housing 302, and by respectively disposing the covers 303 and 304 on the front face and the rear face of the housing 302, the first sub-passage 305 is completed by the sub-passage grooves 332 and 334 and the covers 303 and 304. In such a configuration, all the sub-passage grooves can be molded as part of the housing 302 in the resin molding process of the housing 302. In addition, the dies are disposed on both faces of the housing 302 during the molding of the housing 302, so that by using both dies, both the front side sub-passage groove 332 and the rear side sub-passage groove 334 can be entirely molded as part of the housing 302. By disposing the front cover 303 and the rear cover 304 to both faces of the housing 302, the sub-passage to both faces of the housing 302 can be completed. By molding the front side sub-passage groove 332 and the rear side sub-passage groove 334 in both faces of the housing 302 by using the dies, the first sub-passage 305 can be molded with high precision. In addition, high productivity can be obtained.

As illustrated in FIG. 8, part of the gas 30 to be measured flowing in the main passage 124 is sucked from the first sub-passage inlet 305a into the rear side sub-passage groove 334 to flow in the rear side sub-passage groove 334. Foreign substances having a large mass that intrude into the gas 30 to be measured flow into the discharge Passage extending directly straightly from the biforked portion together with part of the gas 30 to be measured, and are discharged from the discharge port 305c opened to the downstream side outer wall 338 into the main passage 124.

The rear side sub-passage groove 334 becomes deeper as it advances, and the gas 30 to be measured Gradually moves to the front side of the measuring section 331 as it flows along the rear side sub-passage groove 334. In particular, the rear side sub-passage groove 334 has a steep inclining section 334a that abruptly becomes deeper before the opening 333, and part of the air having a small mass moves along the steep inclining section 334a, and flows on the measuring flow path face 430 side of the circuit substrate 400 in the opening 333. Meanwhile, since the foreign substances having a large mass are hard to suddenly change their course, they flow on the side of the measuring flow path face rear face 431.

As illustrated in FIG. 7, the gas 30 to be measured that moves to the front side in the opening 333 flows along the measuring flow path face 430 of the circuit substrate, heat transmission is carried out between the measuring flow path face 430 and the flow rate detecting section 456 for measuring the flow rate through a heat transmission face exposing section 436 disposed in the measuring flow path face 430, thereby measuring the flow rate. The air that flows from the opening 333 to the front side sub-passage groove 332 flows along the front side sub-passage groove 332 together, and is discharged from the first sub-passage outlet 305b opened to the downstream side outer wall 338 into the main passage 124.

Since the substances having a large mass, such as dust, that intrude into the gas 30 to be measured have large inertial force, they are difficult to suddenly change their course in the direction in which the groove is deep, along the front face of the portion of the steep inclining section 334a in which the groove abruptly becomes deeper. Due to this, the foreign substances having a large mass move through the measuring flow path face rear face 431, and can be prevented from passing near the heat transmission face exposing section 436. In this example, many of the foreign substances having a large mass other than the gas pass through the measuring flow path face rear face 431 that is the rear face of the measuring flow path face 430, so that the influence of dirt due to the foreign substances, such as oil, carbon, and dust, can be reduced to prevent lowering of the measurement precision. That is, since the physical quantity detection apparatus 300 has the shape that suddenly changes the course of the gas 30 to be measured along the axis crossing the axis of the flow of the main passage 124, the influence of the foreign substances that intrude into the gas 30 to be measured can be reduced.

In this example, the flow path including the rear side sub-passage groove 334 shifts from the distal end of the housing 302 toward the flange 311 while curving, and the gas flowing in the sub-passage flows in the direction opposite the flow of the main passage 124 at the position closest to the flange 311 side, so that in the portion of the flow in the opposite direction, the sub-passage on the rear side that is one side is connected to the sub-passage molded on the front face side that is the other side. Thus, the heat transmission face exposing section 436 of the circuit substrate 400 is easily fixed to the sub-passage, and the gas 30 to be measured is easily sucked at the position near the center of the main passage 124.

3.2 The Configuration and Effect of the Second Sub-Passage, the Humidity Detection Section, and the Pressure Detecting Sections The second sub-passage 306 is constituted by cooperation of the housing 302, the circuit substrate 400 illustrated in FIGS. 8 and 9, and the rear cover 304 joined to the housing 302. The circuit substrate 400 is disposed along the face of the measuring section 331, and is disposed in parallel along the face of the measuring section 331 to partition the base end of the measuring section 331 into the front face side and the rear face side at the intermediate position between the front face and the rear face of the measuring section 331.

As illustrated in FIG. 8, on the upstream side of the housing 302, the physical quantity detection apparatus 300 has a separating wall 307 that constitutes part of the second sub-passage inlet 306a, extends to the flange 311 side that is the base end side of the measuring section 331, and intercepts the gas 30 to be measured. Likewise, as illustrated in FIG. 8, on the downstream side of the housing 302, the physical quantity detection apparatus 300 has a separating wall 308 that constitutes part of the second sub-passage outlet 306b, and extends to the flange 311 side that is the base end side of the measuring section 331. In addition, the separating wall 307 on the upstream side of the housing and the separating wall 308 on the downstream side of the housing are coupled by a separating wall 309 that extends in the direction parallel with the flow of the gas 30 to be measured to surround the temperature and humidity sensor 452 and the pressure sensors 454 and 455 at the intermediate portion coupled to the flange 311. The separating walls 307, 308, and 309 have the same height in the thickness direction of the measuring section 331, and form the sensor chamber 342 by mounting the rear cover 304.

The second sub-passage 306 extends in parallel along the flow direction of the gas 30 to be measured flowing in the main passage 124, and the temperature and humidity sensor 452 and the pressure sensors 454 and 455 that are the physical quantity detection sensors are disposed at the positions spaced from each other in the direction crossing the straight line connecting the second sub-passage inlet 306a and the second sub-passage outlet 306b. The inlet 306a and the outlet 306b of the second sub-passage 306 are opened perpendicularly to the gas 30 to be measured flowing in the main passage 124, and are disposed on the same line parallel with the flow of the gas 30 to be measured. In addition, the temperature and humidity sensor 452 and the pressure sensors 454 and 455 are disposed in the sensor chamber 342 surrounded by the separating walls 307, 308, and 309 at the positions biased to the flange 311 side from the flow line of the flow of the air in the passage connecting the second sub-passage inlet 306a and the second sub-passage outlet 306b.

Typically, when the plurality of physical quantity detection sensors are constituted in the same electronic circuit, power consumption is simply increased according to the number of the physical quantity detection sensors. Power consumption (electric energy) is known to be converted to heat (energy) through the resistor, and the increase in power consumption increases the heat generated in the entire circuit. The increased self-generated heat in the circuit affects the durability performance of the circuit components and the performance of the physical quantity detection sensors. The temperature range required for the automobile components is wide, and is in the range of −40° C. to 125° C. In particular, the electronic circuit for the physical quantity detection sensors includes a semiconductor component, such as the microcomputer. The semiconductor component is typically used in the range not exceeding the junction temperature of approximately 150° C. which is the total temperature of the high-temperature environment and the self-generated heat in the circuit. The junction temperature is the temperature of the junction portion of the semiconductor device and the lead wire, and the product durability life is significantly reduced during use in an environment above approximately 150° C. Therefore, heat release design that minimizes the self-generated heat in the circuit is required. In addition, in the performance of the physical quantity detection apparatus 300, the change in characteristic due to the temperature influence is inevitably present at high and low temperatures, so that the temperature rise due to the heat conduction from the self-generated heat in the circuit leads to deterioration of the measurement precision of the detection sensors.

To such a problem, in this example, the rear face of the circuit substrate 400 constitutes part of the second sub-passage 306. Thus, the rear face of the circuit substrate 400 is exposed to the air flowing in the second sub-passage 306. That is, the self-generated heat generated in the circuit component, such as a microcomputer 605, mounted on the front face of the circuit substrate 400 is thermally conducted to the rear face of the circuit substrate 400, and is further thermally transmitted to the air flowing in the second sub-passage 306, thereby preventing the heat generation in the entire circuit substrate 400.

In addition, the pressure sensor 455 is disposed behind the separating wall 307 on the upstream side of the housing 302, so that the gas 30 to be measured flowing into the second sub-passage 306 can be prevented from directly colliding on the pressure sensor 455, and the flow of the air can be prevented from directly affecting the pressure sensor 455. That is, the pressure sensor 455 can correctly measure static pressure to be measured without detecting dynamic pressure generated by the flow of the air, thereby securing the measurement precision.

The inlet 306a and the outlet 306b of the second sub-passage are located on the same line, so that the detection sensors (here, the disposing order of the detection sensors is not limited to FIG. 8) are biased from the same line and disposed at the intermediate portion between the separating wall 307 on the upstream side of the housing 302 and the separating wall 308 on the downstream side of the housing 302, thereby preventing dust and water droplets that intrude into the gas 30 to be measured from directly colliding on the detection sensors and reducing contaminant deterioration and change of output.

Figure 13:
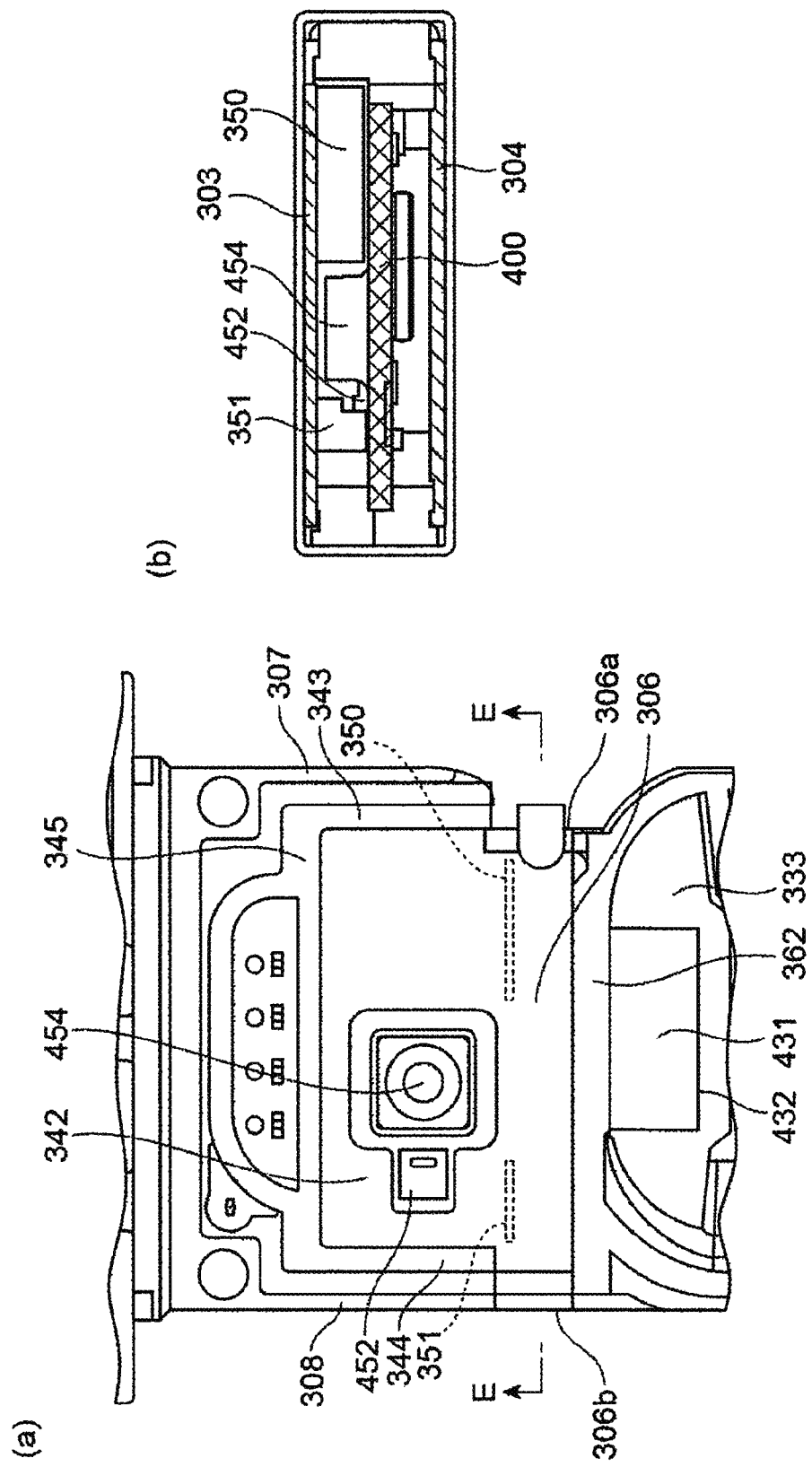
FIG. 13 are explanatory views of the configuration of the sensor chamber according to another example, in which (a) is an enlarged view of the sensor chamber, and (b) is a cross-sectional view taken along line E-E of (a).
Figure 14:
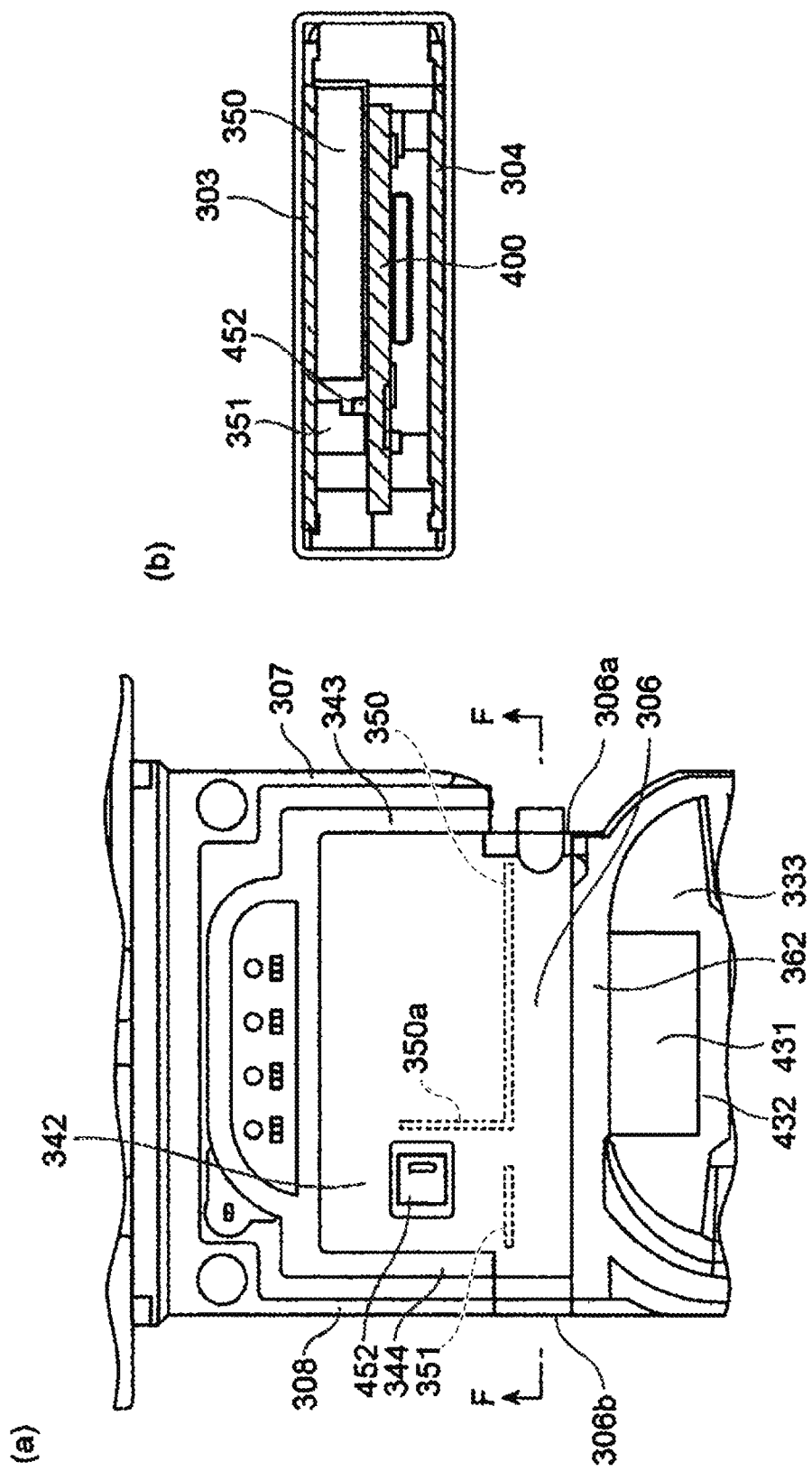
FIG. 14 are explanatory views of the configuration of the sensor chamber according to a further example, in which (a) is an enlarged view of the sensor chamber, and (b) is a cross-sectional view taken along line F-F of (a).

3.3 The Configuration and Effect of the Rear Cover, the Humidity Detection Section, and the Pressure Detection Sections FIG. 10 and FIG. 11 are diagrams illustrating the configurations of the front cover and the rear cover. In addition, FIGS. 12 to 14 illustrate a plurality of examples of the second sub-passage constituted by the rear cover.

As described above, the sub-passage groove for forming the second sub-passage 306 is constituted in the rear face of the housing 302, and the rear cover 304 is disposed to separate the sub-passage groove other than the second sub-passage inlet 306a and the second sub-passage outlet 306b thereof, from the gas 30 to be measured.

Figure 12:
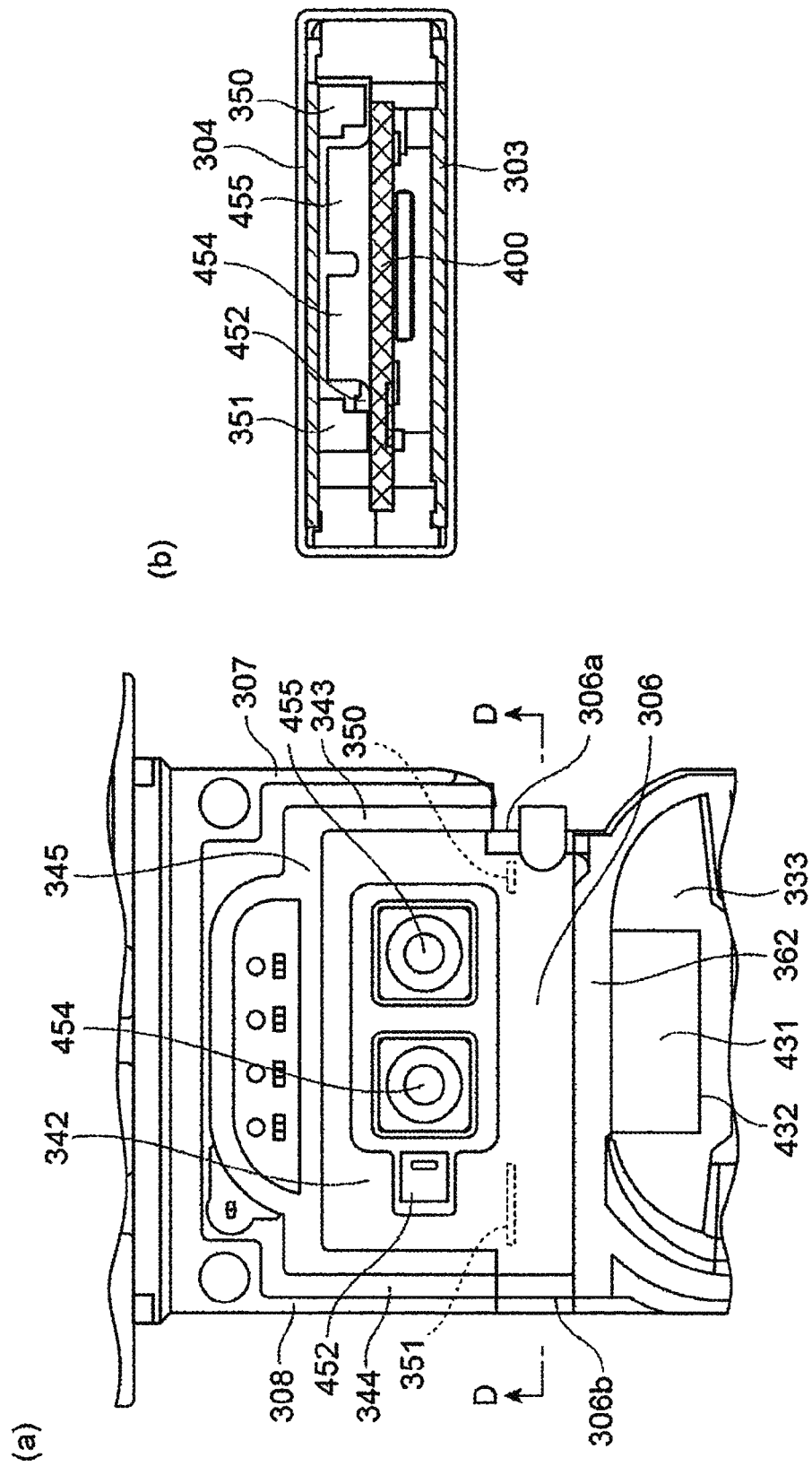
FIG. 12 are explanatory views of the configuration of a sensor chamber, in which (a) is an enlarged view of the sensor chamber, and (b) is a cross-sectional view taken along line D-D of (a).

In FIG. 12, the temperature and humidity sensor 452 and the pressure sensors 454 and 455 are mounted on the rear face of the circuit substrate 400. In FIGS. 11 and 12(a), a protrusion 350 on the upstream side and a protrusion 351 on the downstream side formed on the rear cover 304 are indicated by dotted lines. FIG. 12(b) illustrates a cross section taken along line D-D of FIG. 12(a), and illustrates the disposing example of the protrusions 350 and 351.

The protrusions 350 and 351 constitute sectioning walls sectioning the second sub-passage 306 of the circuit substrate 400 into the passage and the sensor chamber 342 by mounting the rear cover 304. The protrusion 350 on the upstream side is formed to extend along the flow direction of the gas 30 to be measured between the second sub-passage inlet 306a and the pressure sensor 455 on the upstream side. The protrusion 351 on the downstream side is formed to extend along the flow direction of the gas 30 to be measured between the pressure sensor 454 on the downstream side and the second sub-passage outlet 306b. Both the protrusions 350 and 351 including thin plate protrusion pieces are formed integrally with the rear cover 304, protrude toward the circuit substrate 400 along the thickness direction of the measuring section 331, and are disposed in parallel with the flow of the gas 30 to be measured and on the straight line at the position at the height similar to each other with respect to the longitudinal direction of the measuring section 331.

In this example, when the gas 30 to be measured flows from the second sub-passage inlet 306a, the flow is corrected by the protrusion 350 on the upstream side and the protrusion 351 on the downstream side, passes on the straight line connecting the second sub-passage inlet 306a and the second sub-passage outlet 306b, and is discharged from the outlet 306b.

That is, since the sensor chamber 342 is biased to the base end side of the measuring section 331 (the flange 311 side) from the passage of the second sub-passage 306, the gas 30 to be measured that flows from the second sub-passage inlet 306a into the second sub-passage 306 directly straightly moves in the passage of the second sub-passage 306, and is discharged to the outside from the second sub-passage outlet 306b without being admitted into the sensor chamber 342. Thus, the gas 30 to be measured can be prevented from directly colliding on the physical quantity detection sensors, such as the pressure sensors 454 and 455 and the temperature and humidity sensor 452 in the sensor chamber 342.

Typically, in the suction pipe, water droplets and contaminants having a constant mass intrude into the gas 30 to be measured to pass in the second sub-passage 306. Thus, by preventing the gas 30 to be measured from directly colliding on the physical quantity detection sensors, output change due to contaminants deterioration and water droplets in the physical quantity detection sensors can be prevented, thereby reducing measurement error. Specifically, by preventing the gas 30 to be measured from directly colliding on the pressure sensors 454 and 455, the influence of the dynamic pressure is reduced, thereby preventing the detection precision from being worsened. And, by preventing the gas 30 to be measured from directly colliding on the temperature and humidity sensor 452, the temperature and humidity sensor 452 can be prevented from durability lowering due to adherence of water droplets and contaminants.

In FIG. 13, the temperature and humidity sensor 452 and the pressure sensor 454 are mounted on the rear face of the circuit substrate 400. In FIG. 13(a), the protrusion 350 on the upstream side is disposed between the second sub-passage inlet 306a and the pressure sensor 454, and is formed of a thin plate to extend in the flow direction of the gas 30 to be measured. The already described symbols, configurations, and effects are omitted here. In this example, as compared with FIG. 12, the number of pressure sensors is reduced to one, so that the protrusion 350 on the upstream side becomes long to fill the space accordingly.

In FIG. 14, the temperature and humidity sensor 452 is mounted on the rear face of the circuit substrate 400. In FIG. 14(a), the protrusion 350 on the upstream side is disposed between the second sub-passage inlet 306a and the temperature and humidity sensor 452, extends in the flow direction of the gas 30 to be measured, and is made of a thin plate being bent before the temperature and humidity sensor 452 and extending in the direction orthogonal to the flow of the gas 30 to be measured.

In this example, the temperature and humidity sensor 452 is mounted at the position spaced by a fixed distance from the separating wall 307 on the upstream side of the housing 302. Thus, in order that the protrusion 350 on the upstream side of the cover 304 can have the same effect as the separating wall 307, a thin plate 350a is constituted to be orthogonal to the flow of the gas 30 to be measured. With this, water droplets and contaminants intruding into the air passing in the second sub-passage 306 can prevent the air from directly colliding on the sensors, and output change due to the contaminants deterioration and water droplets in the sensor can be prevented to reduce measurement error.

4. The Signal Processing of the Physical Quantity Detection Apparatus 300

Figure 15:
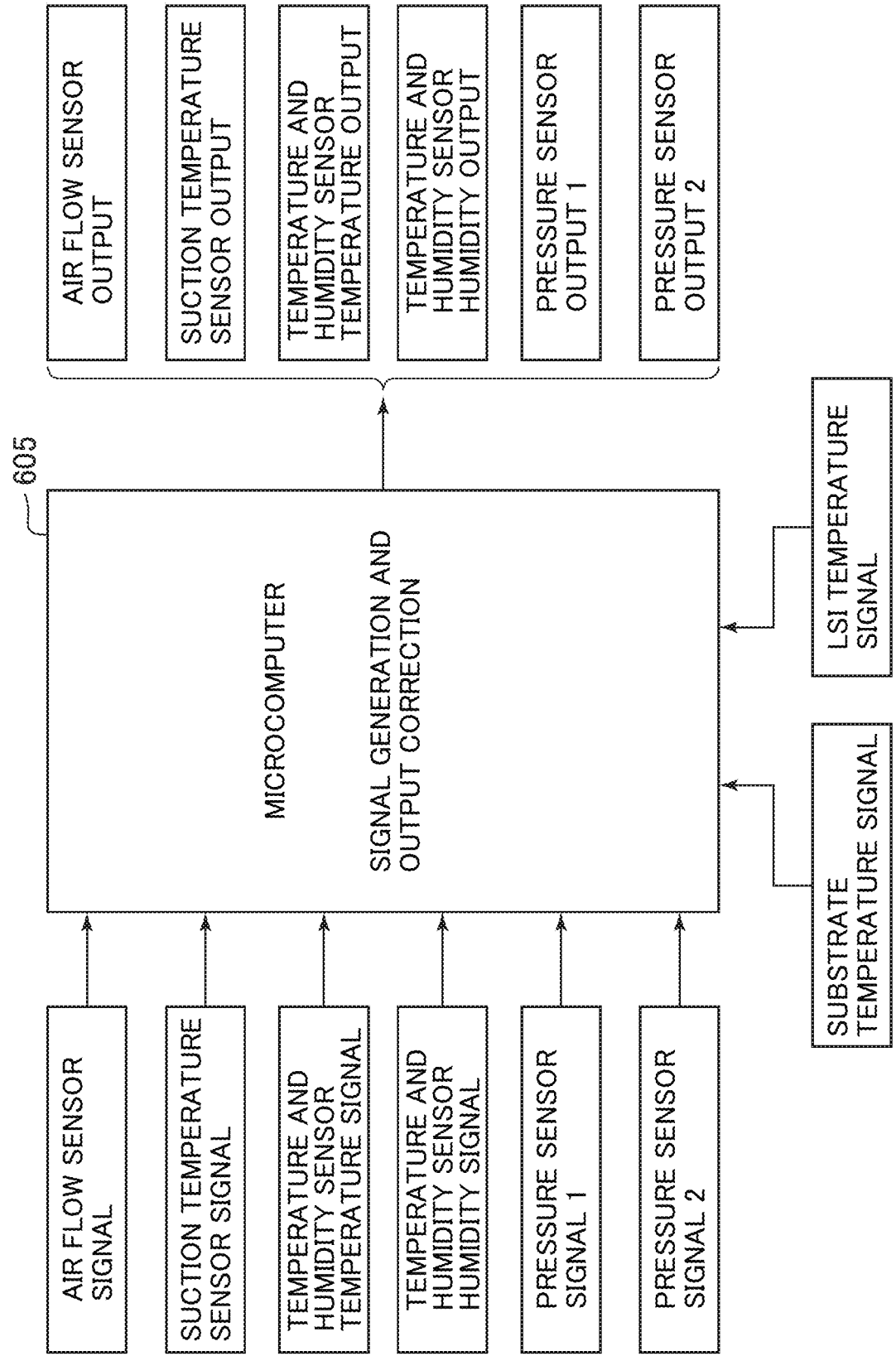
FIG. 15 is an explanatory view of the inputs and outputs of the physical quantity detection apparatus.

FIG. 15 illustrates the signal input and output relation of the physical quantity detection apparatus 300. In this example, the physical quantity detection sensors are each mounted on each of the front face and the rear face of one circuit substrate 400, thereby reducing the substrate in size. Therefore, in the signal processing, to reduce the number of electronic circuit components, all signals are fetched from the physical quantity detection sensors by one microcomputer 605 to carry out signal generation and correction so that the signals can be read by the controller 200. In addition, as illustrated in FIGS. 5 and 7, the circuit substrate 400 transmits the electric signals to the controller 200 through AL wires 324 and the external terminals 323.

5. A Summary

According to the physical quantity detection apparatus of this example, the detection sensors 451 to 455 are each mounted on each of one face and the other face of the circuit substrate 400, thereby reducing the circuit substrate 400 in size. The size-reduced circuit substrate 400 can reduce the housing of the physical quantity detection apparatus 300 in size. This leads to securing of the space in the engine room, and to the reduction in the pressure loss in the suction pipe.

In addition, in this example, part of the circuit substrate 400 constitutes part of the second sub-passage 306. Thus, the other face of the circuit substrate 400 is exposed to the air flowing in the second sub-passage 306. That is, the self-generated heat generated in the circuit component, such as the microcomputer 605, mounted on one face of the circuit substrate 400 is thermally conducted to the other face of the circuit substrate 400, and is further thermally transmitted to the air flowing in the second sub-passage 306, so that the heat generation in the entire circuit substrate 400 can be prevented.

Figure 16:
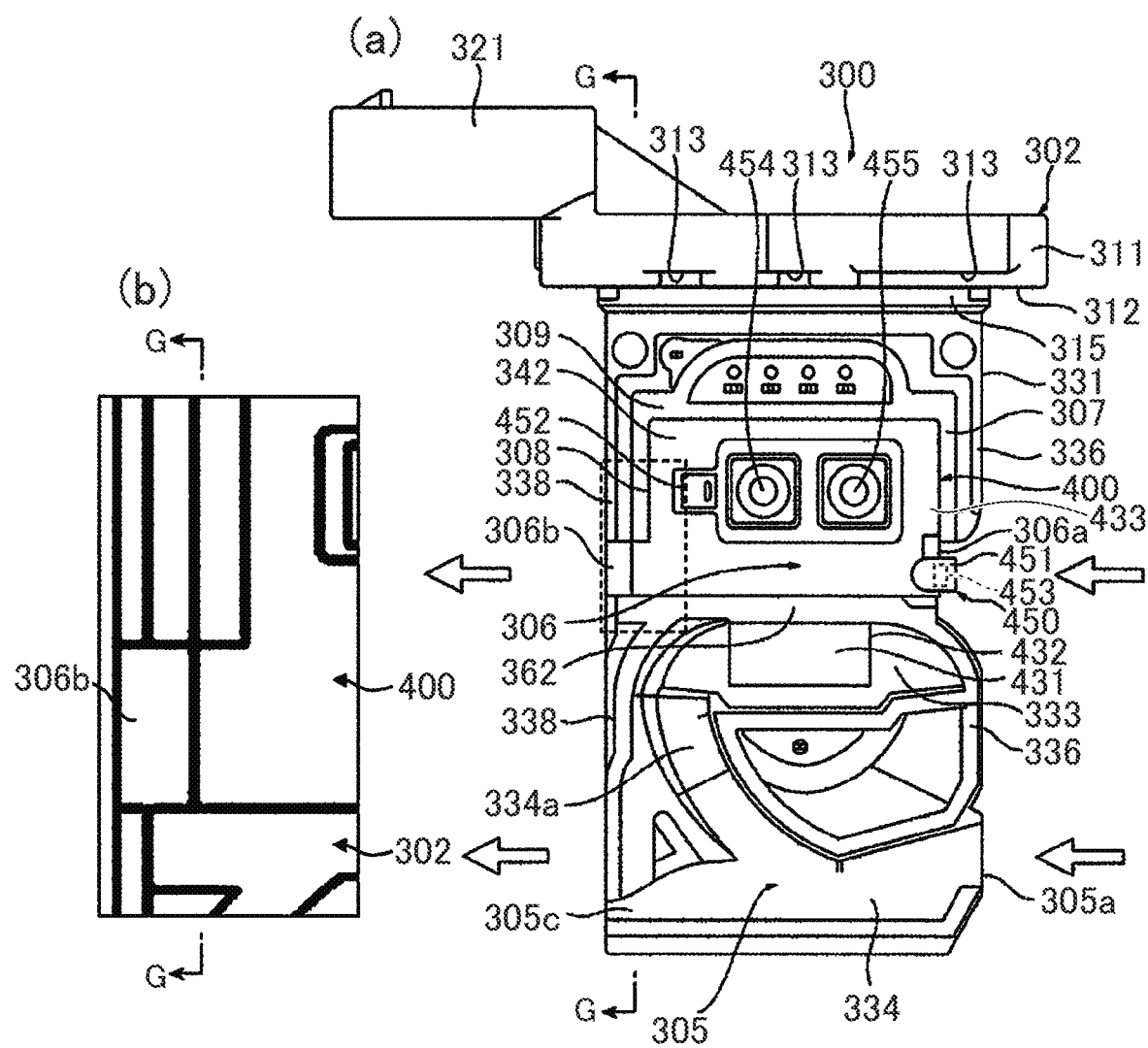
FIG. 16 are rear views of the physical quantity detection apparatus immediately after insert molding.
Figure 17:
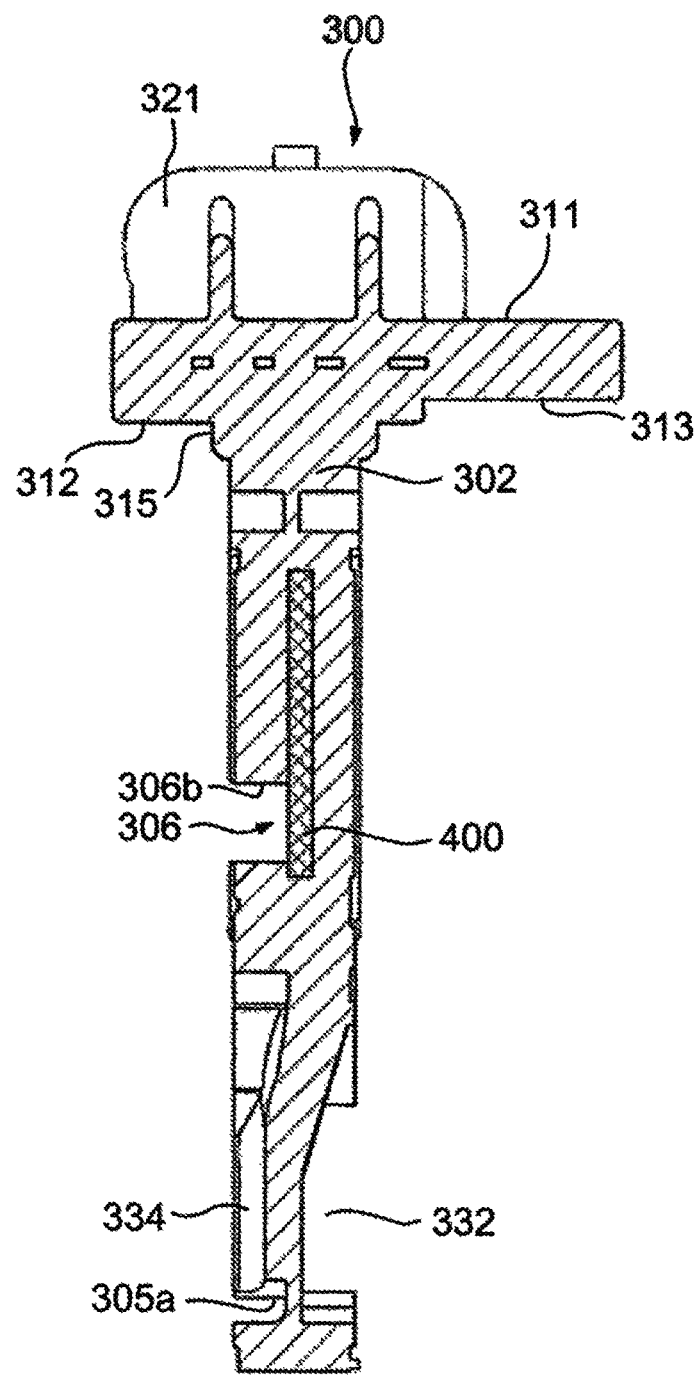
FIG. 17 is a cross-sectional view taken along line G-G of FIG. 16.

6. Examples in which a Reinforcing Section 701 is Added to the Second Sub-Passage 306 and the Effect thereof Referring to FIGS. 16 and 17, the physical quantity detection apparatus 300 immediately after the circuit substrate 400 of the above example is insert molded will be described. FIG. 16(a) illustrates the appearance of the physical quantity detection apparatus 300 of the above example. FIG. 16(b) is an enlarged view of the dashed-line region near the second sub-passage outlet 306b of FIG. 16(a). FIG. 17 is a cross-sectional view taken along line G-G of FIG. 16.

In FIG. 17, a housing resin is not formed near the second sub-passage inlet 306a and the second sub-passage outlet 306b, but is formed on the rear side of the circuit substrate 400 to include the positions facing the second sub-passage inlet 306a and the second sub-passage outlet 306b.

Figure 18:
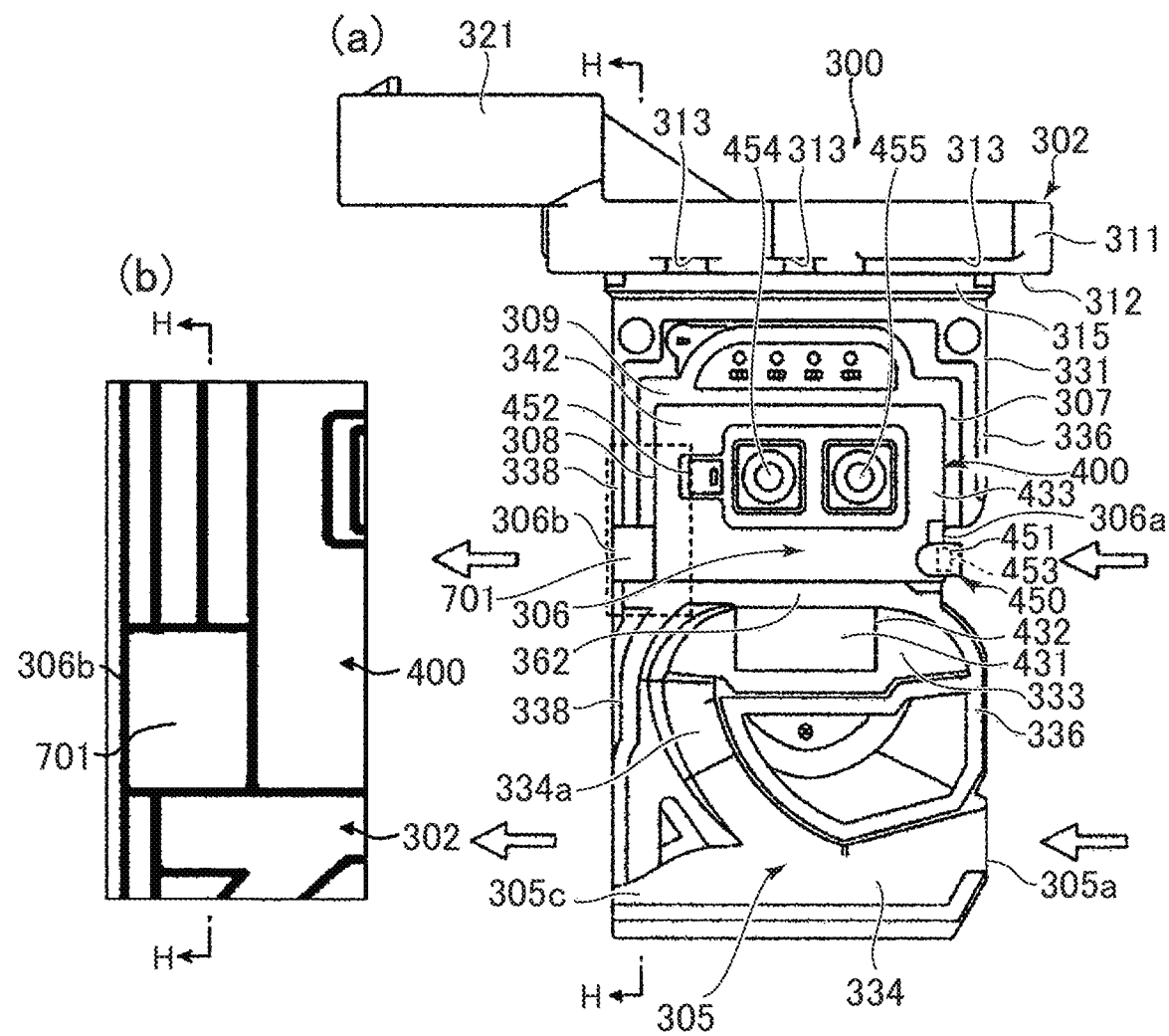
FIG. 18 are rear views of the physical quantity detection apparatus immediately after insert molding.
Figure 19:
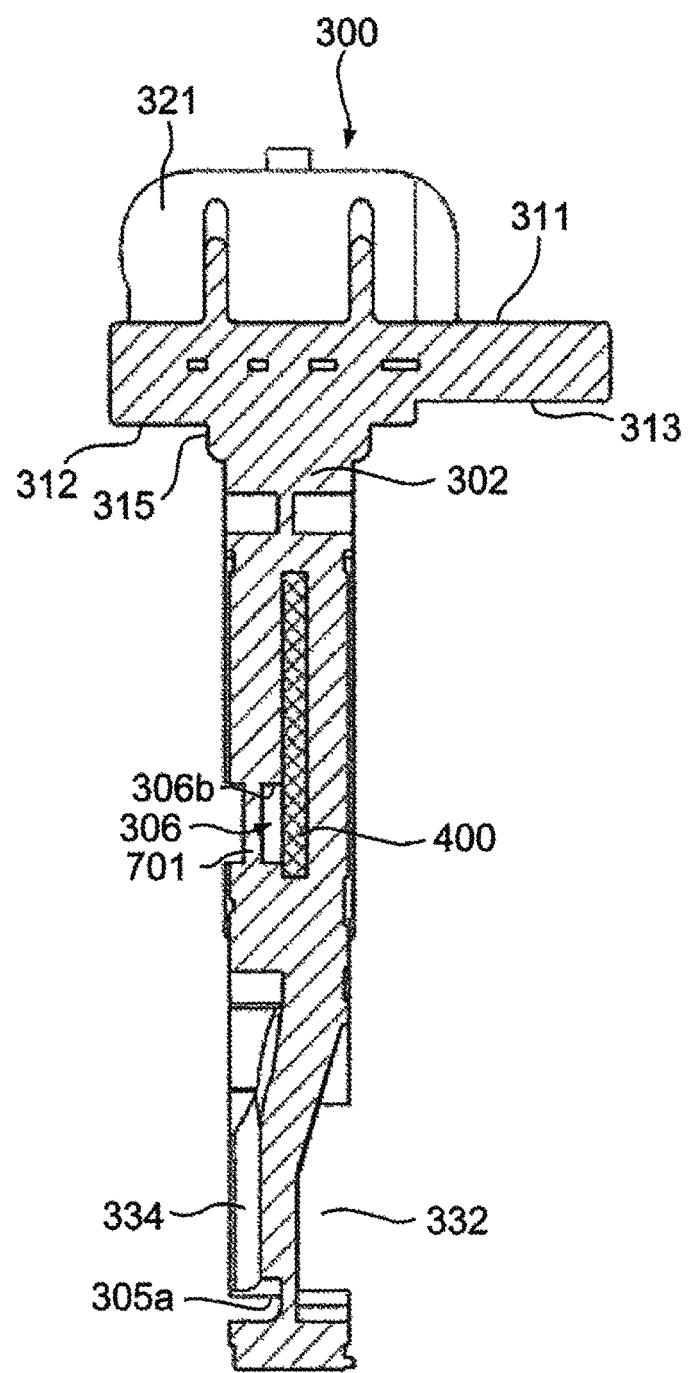
FIG. 19 is a cross-sectional view taken along line H-H of FIG. 18.

FIGS. 18 and 19 are appearance diagrams of an example different from the above example illustrated in FIGS. 16 and 17. FIG. 18(a) is an appearance diagram of the physical quantity detection apparatus 300 of this example. FIG. 18(b) is an enlarged view of the dashed-line region near the second sub-passage outlet 306b of FIG. 18(a). FIG. 19 is a cross-sectional view taken along line H-H of FIG. 18.

The physical quantity detection apparatus 300 of this example is different from FIGS. 16 and 17 in that it has the reinforcing section 701 made of the housing resin near the second sub-passage outlet 306b. The reinforcing section 701 can be formed at any position on the straight line connecting the second sub-passage inlet 306a and the second sub-passage outlet 306b. In this example, the reinforcing section 701 is formed on the projection plane of the circuit substrate 400. An example in which the reinforcing section 701 is formed at the position that is not on the projection plane of the circuit substrate 400 will be described later with reference to FIGS. 28 and 29. The reinforcing section 701 of this example is disposed at the middle stage of the housing resin in the thickness direction of the circuit substrate, but an example in which the reinforcing section 701 is disposed at the upper stage of the housing resin will be described later with reference to FIGS. 20 and 21.

Here, the role played by the reinforcing section 701 will be described by comparing FIGS. 17 and 19. As described in FIGS. 16 and 17, in FIG. 17, the housing resin is not formed near the second sub-passage inlet 306a and the second sub-passage outlet 306b, but is formed at the position facing the second sub-passage inlet 306a and the second sub-passage outlet 306b on the rear face side of the circuit substrate 400. That is, from the comparison of the housing resins formed on the front face side and the rear face side of the circuit substrate 400, there is a region in which the housing resin is formed on the front face side and the housing resin is not formed on the rear face side. In the resin molding of the housing 302, volume shrinkage occurs when the resin is cooled from the high temperature state to the low temperature state and is cured, so that when as described above, the shape of the housing resin is different on the front face side and the rear face side across the circuit substrate 400, a large difference occurs in the shrinking force, which becomes stress to bend the circuit substrate 400. As a result, the circuit substrate 400 can be deformed to disconnect the electronic circuit formed on the circuit substrate, and the circuit substrate 400 and the housing 302 can be separated from each other to lower the measurement precision. In the example illustrated in FIGS. 18 and 19, the reinforcing section 701 can prevent the bending deformation due to the difference in the disposing balance of the housing resin, so that the disconnection of the electronic circuit, the separation of the circuit substrate 400 and the housing 302, the lowering of the measurement accuracy, and the like can be prevented.

Figure 20:
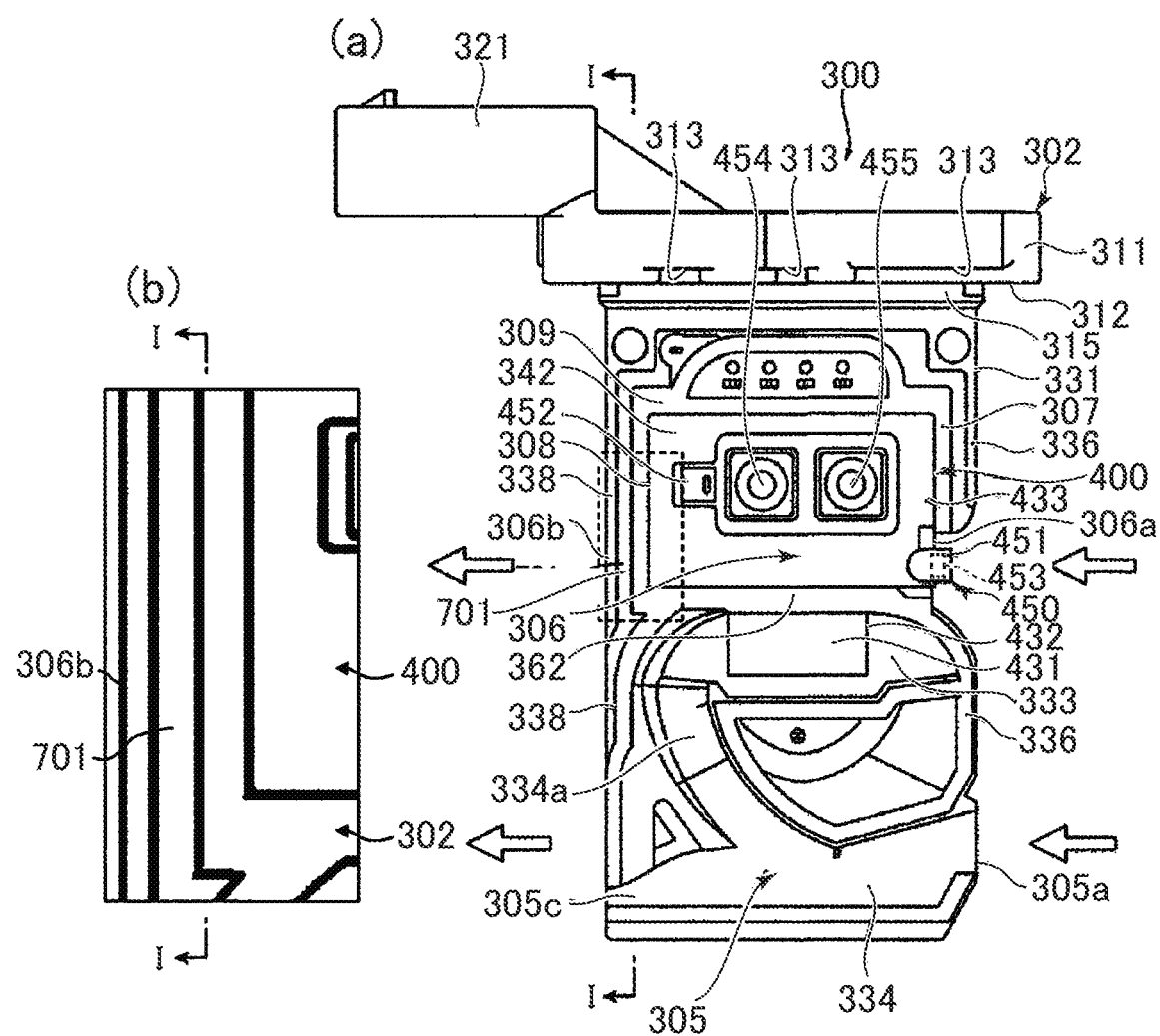
FIG. 20 are rear views of the physical quantity detection apparatus immediately after insert molding.
Figure 21:
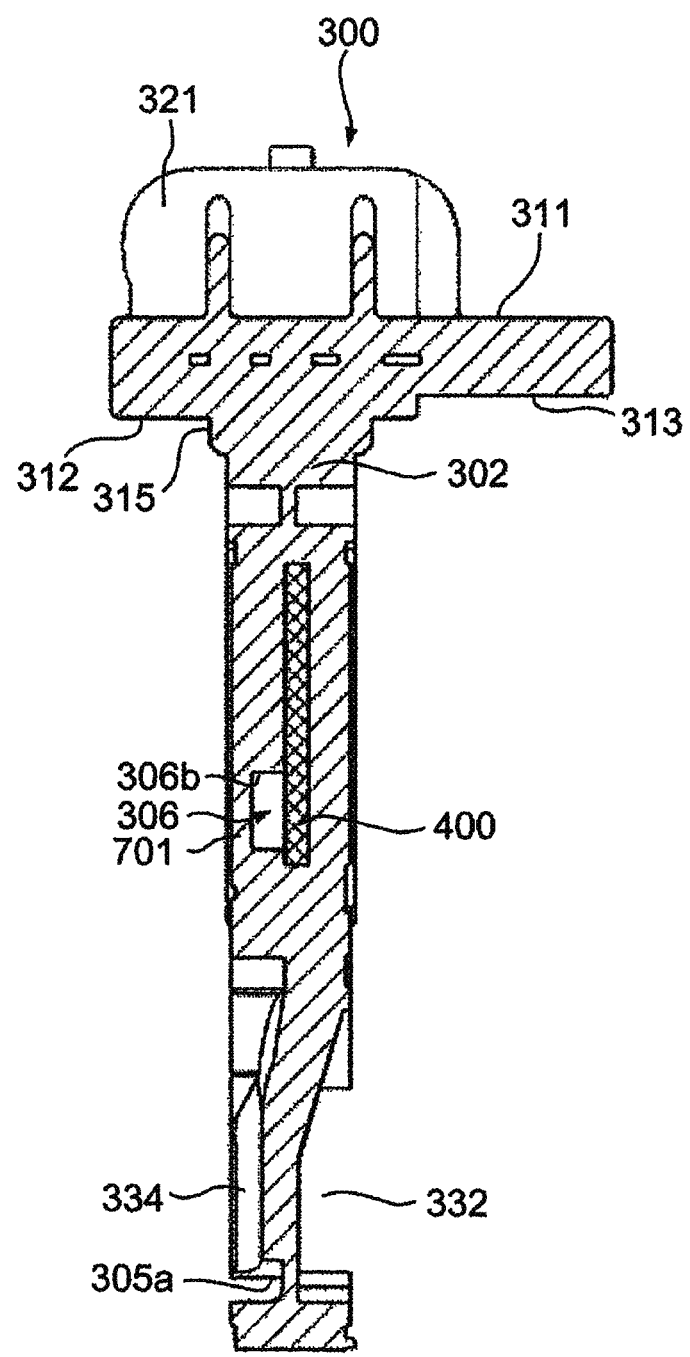
FIG. 21 is a cross-sectional view taken along line I-I of FIG. 20.

Referring to FIGS. 20 and 21, an example in which the reinforcing section 701 is disposed at the upper stage of the housing resin will be described. FIG. 20(a) is an appearance diagram of the physical quantity detection apparatus 300 of this example. FIG. 20(b) is an enlarged view near the second sub-passage outlet 306b. FIG. 21 is a cross sectional view taken along line I-I of FIG. 20. In this example, the reinforcing section 701 is disposed at the furthest Position from the circuit substrate 400 that is the center of the bending, thereby maximizing the effect of preventing the bending.

The configurations of the three examples have been described above by comparing them with reference to FIGS. 16 to 21, and the results obtained by evaluating the magnitudes of the bending prevention effects of the three examples by a thermal stress analyzing method will be described with reference to FIGS. 22 to 25.

Figure 23:
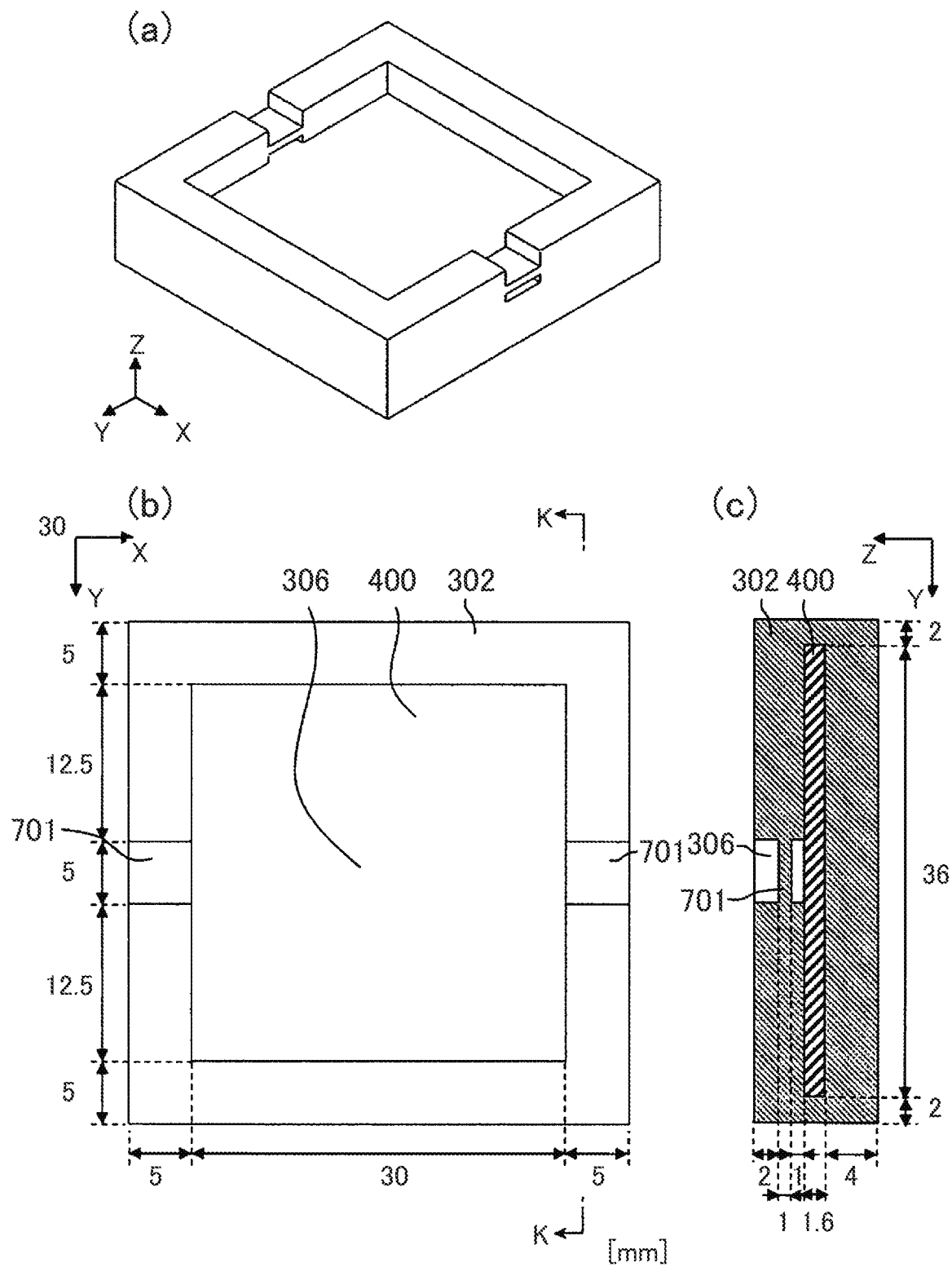
FIG. 23 are analysis model diagrams of a second sub-passage that simulates an example illustrated in FIGS. 18 and 19.
Figure 24:
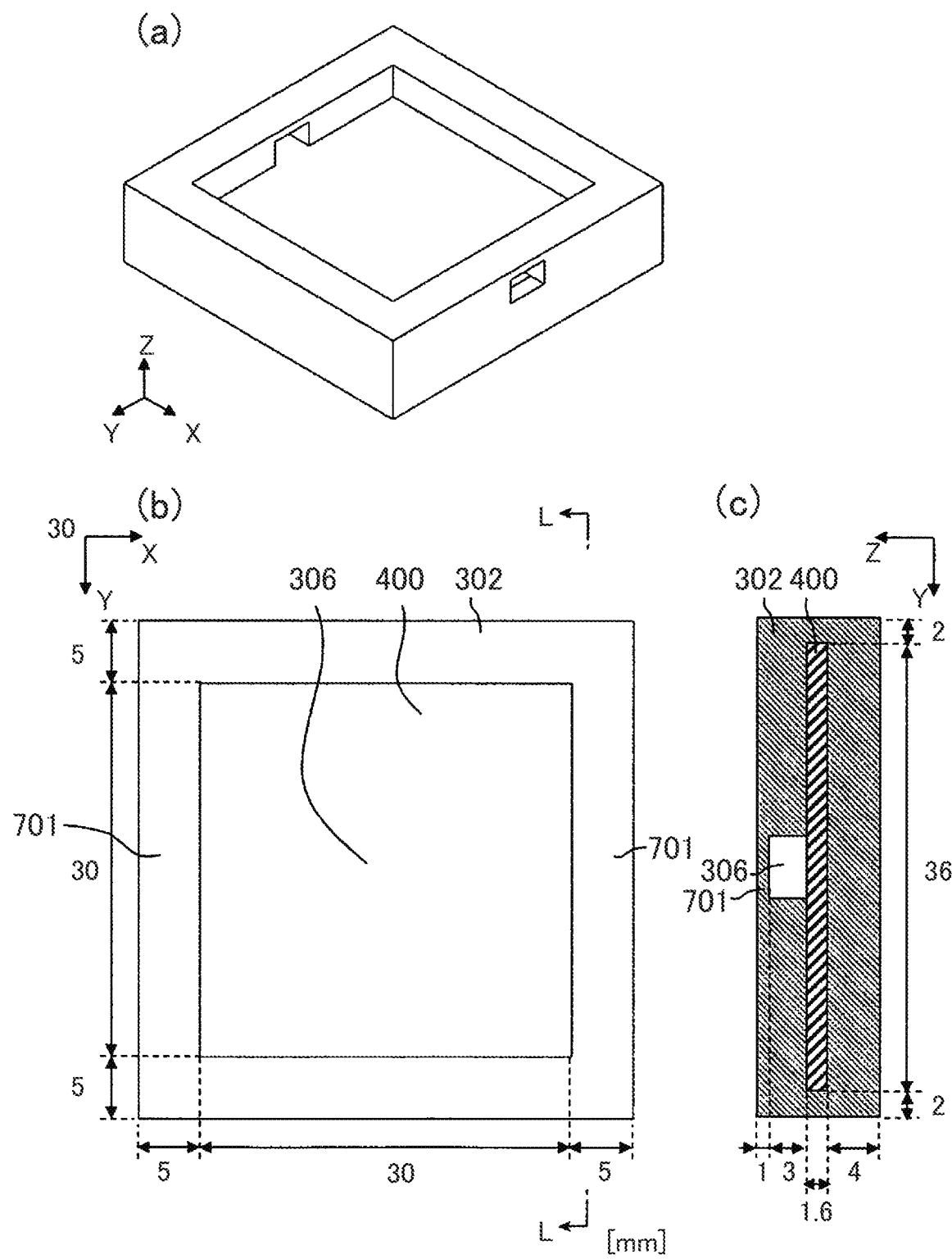
FIG. 24 are analysis model diagrams of a second sub-passage that simulates an example illustrated in FIGS. 20 and 21.
Figure 25:
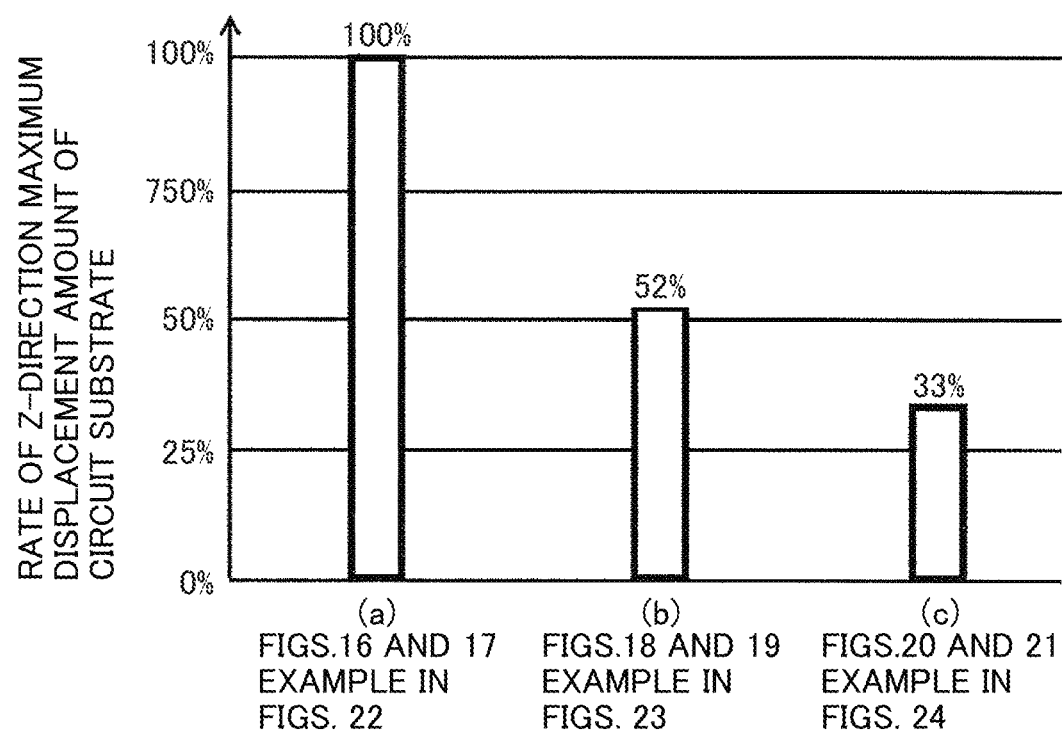
FIG. 25 is a graph illustrating the results of the Z-direction maximum displacement amounts of a circuit substrate in the analysis models.

FIGS. 22(a), (b), and (c) illustrate the analysis model of the example illustrated in FIGS. 16 and 17, FIGS. 23(a), (b), and (c) illustrate the analysis model of the example illustrated in FIGS. 18 and 19, and FIGS. 24(a), (b), and (c) illustrate the analysis model of the example illustrated in FIGS. 20 and 21. The housing 302 has a Young's modulus of 4.5 GPa, a Poisson's ratio of 0.3, and a linear expansion coefficient of $4.0 \times 10^{-5}$, and the circuit substrate 400 has a Young's modulus of 20 GPa, a Poisson's ratio of 0.3, and a linear expansion coefficient of $1.0 \times 10^{-5}$. Under the above conditions, FIG. 25 represents the results obtained by calculating the Z-direction maximum displacement amounts of the circuit substrate 400 when the circuit substrate 400 and the housing 302 are entirely cooled from 250° C. to 25° C. With the Z-direction maximum displacement amount of the model in FIG. 22 without the reinforcing section 701 as a reference, the Z-direction maximum displacement amounts of the other models are represented in terms of percent. As compared with the analysis model in FIG. 22, the analysis model in FIG. 23 has the Z-direction maximum displacement amount of 52%, and the analysis model in FIG. 24 has the Z-direction maximum displacement amount of 33%. That is, the bending deformation preventing effect is clearly exhibited when the physical quantity detection apparatus has the reinforcing section 701, and in particular, when the reinforcing section 701 is disposed at the furthest position from the circuit substrate 400 that is the center of the bending, the bending deformation preventing effect is found to be maximized.

Figure 26:
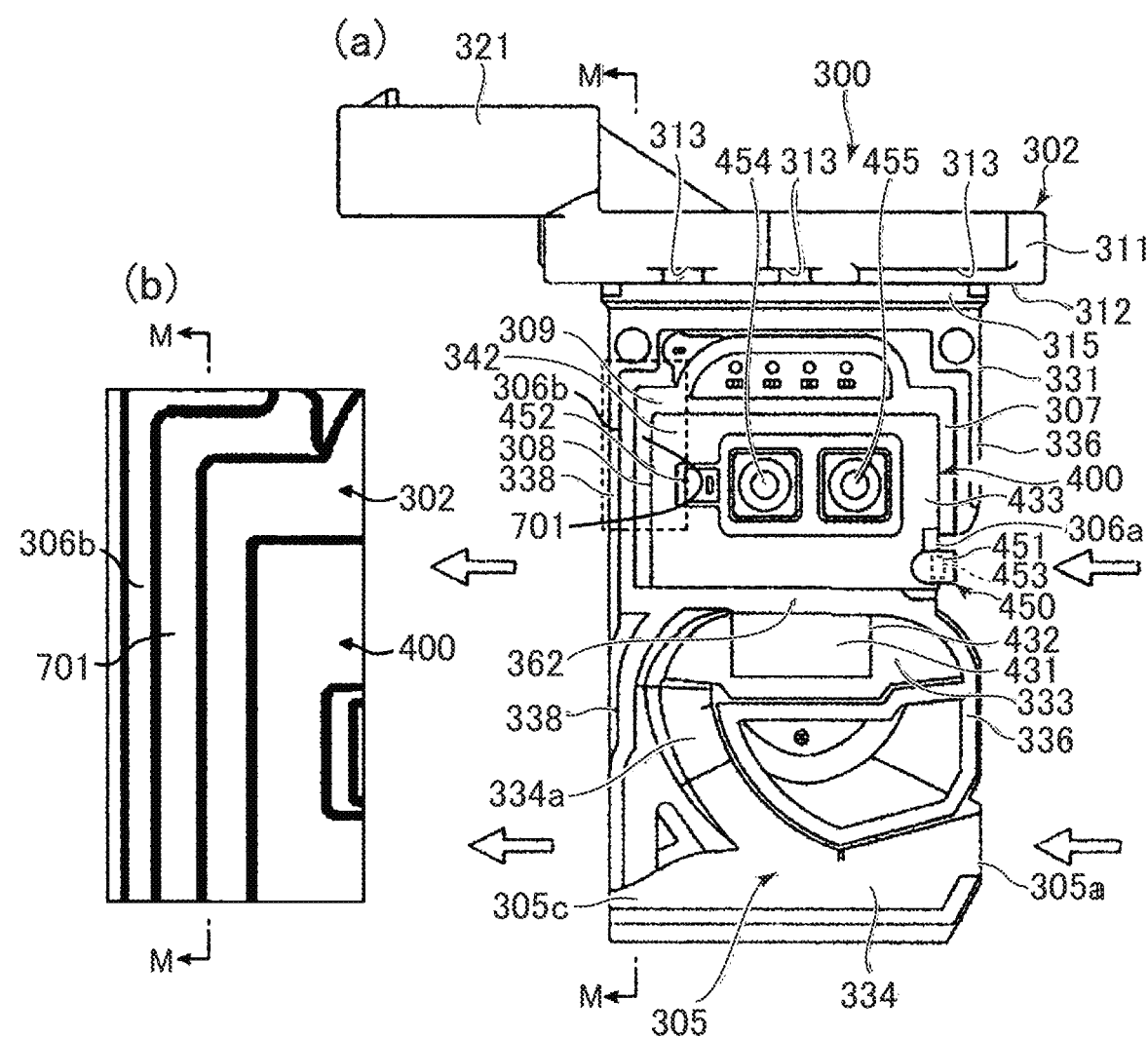
FIG. 26 are rear views of the physical quantity detection apparatus immediately after insert molding.
Figure 27:
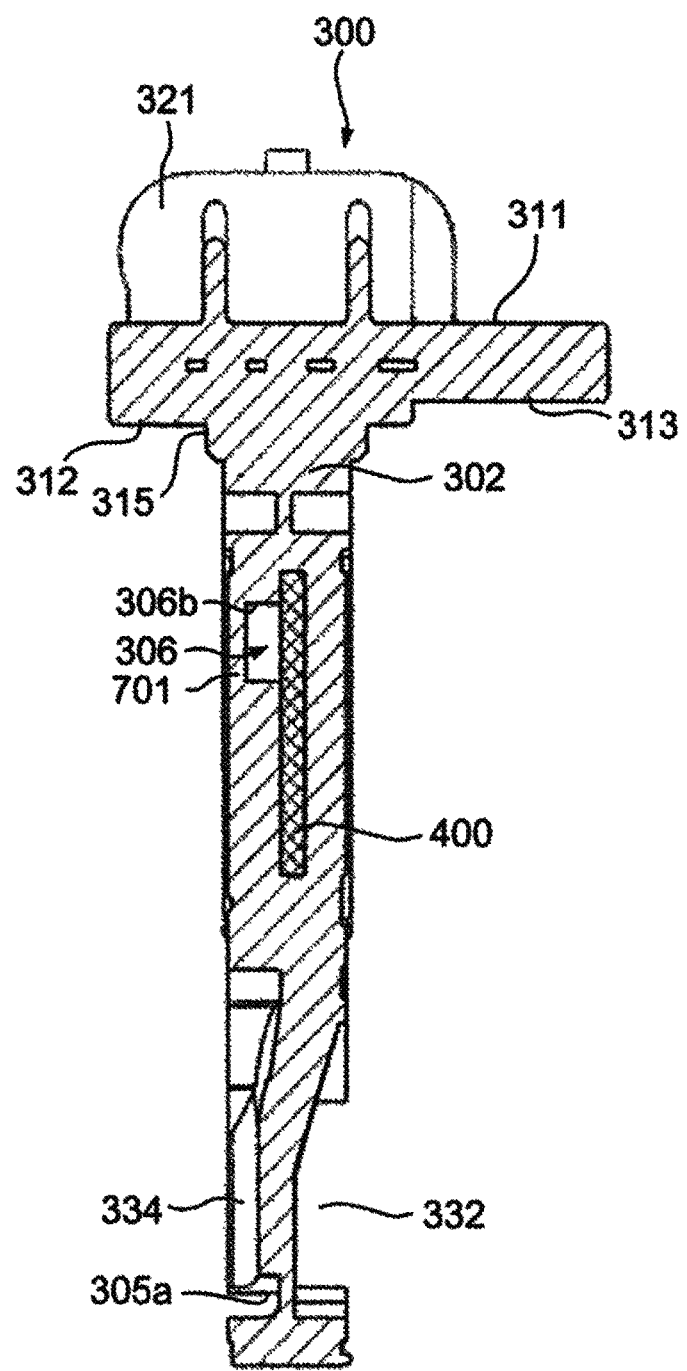
FIG. 27 is a cross-sectional view taken along line M-M of FIG. 25.

FIGS. 26 and 27 illustrate an example in which the second sub-passage outlet 306b and the reinforcing section 701 are disposed on the flange 311 side from the example illustrated in FIGS. 20 and 21. FIG. 26(a) illustrates the appearance of the physical quantity detection apparatus 300 of this example. FIG. 26(b) is an enlarged view of the dashed-line region near the second sub-passage outlet 306b. FIG. 27 is a cross-sectional view taken along line M-M of FIG. 26.

In the description of FIG. 8, the second sub-passage 306 extends in parallel along the flow direction of the gas 30 to be measured flowing in the main passage 124, and the inlet 306a and the outlet 306b of the second sub-passage 306 are opened perpendicularly to the gas 30 to be measured flowing in the main passage 124, and are disposed on the same line parallel with the flow of the gas 30 to be measured. In this example, the second sub-passage outlet 306b is disposed slightly toward the flange 311 side as compared with the second sub-passage inlet 306a. Even in such disposing, stress to bend the circuit substrate 400 occurs, so that it is effective to dispose the reinforcing section 701.

Figure 28:
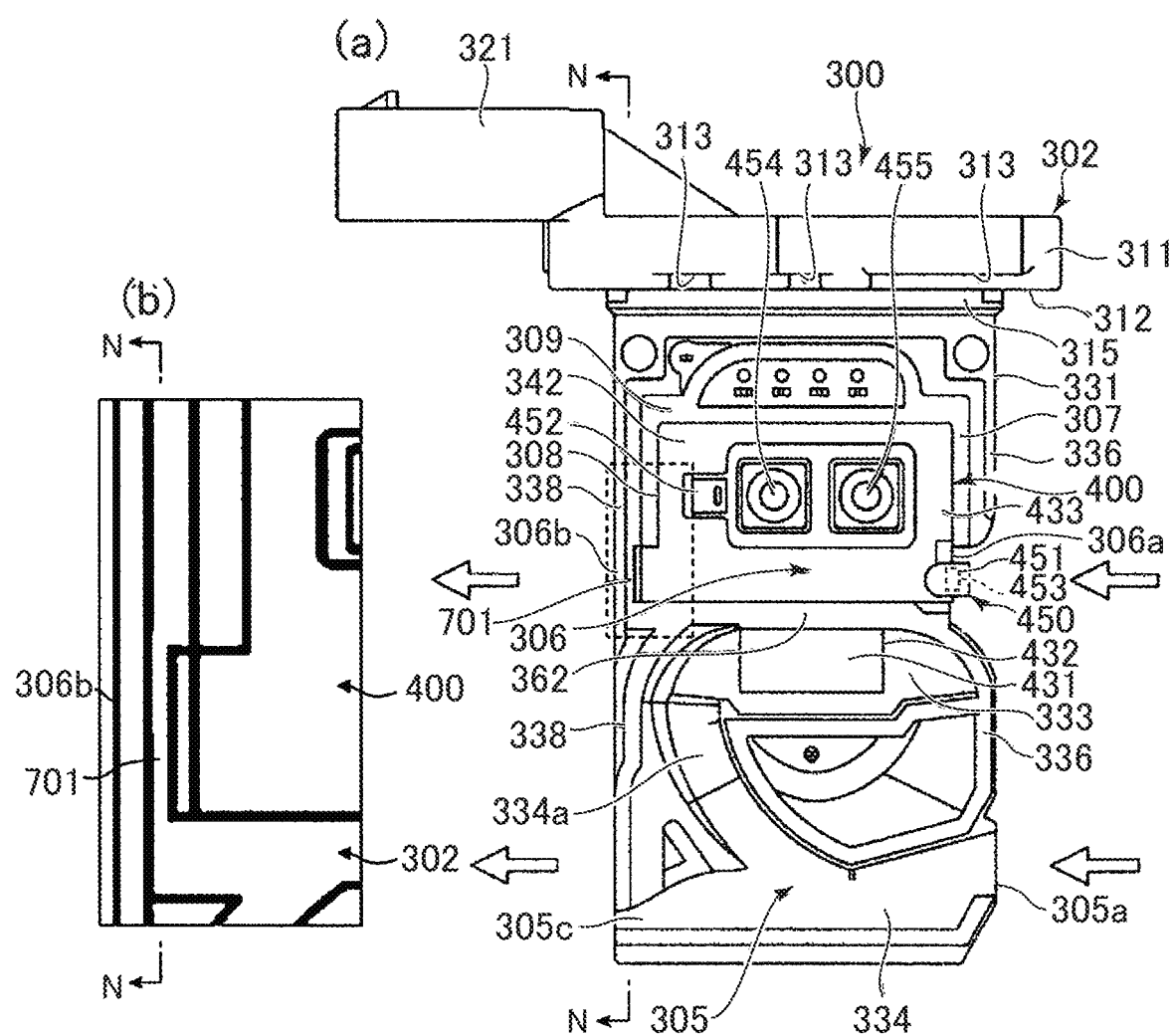
FIG. 28 are rear views of the physical quantity detection apparatus immediately after insert molding.
Figure 29:
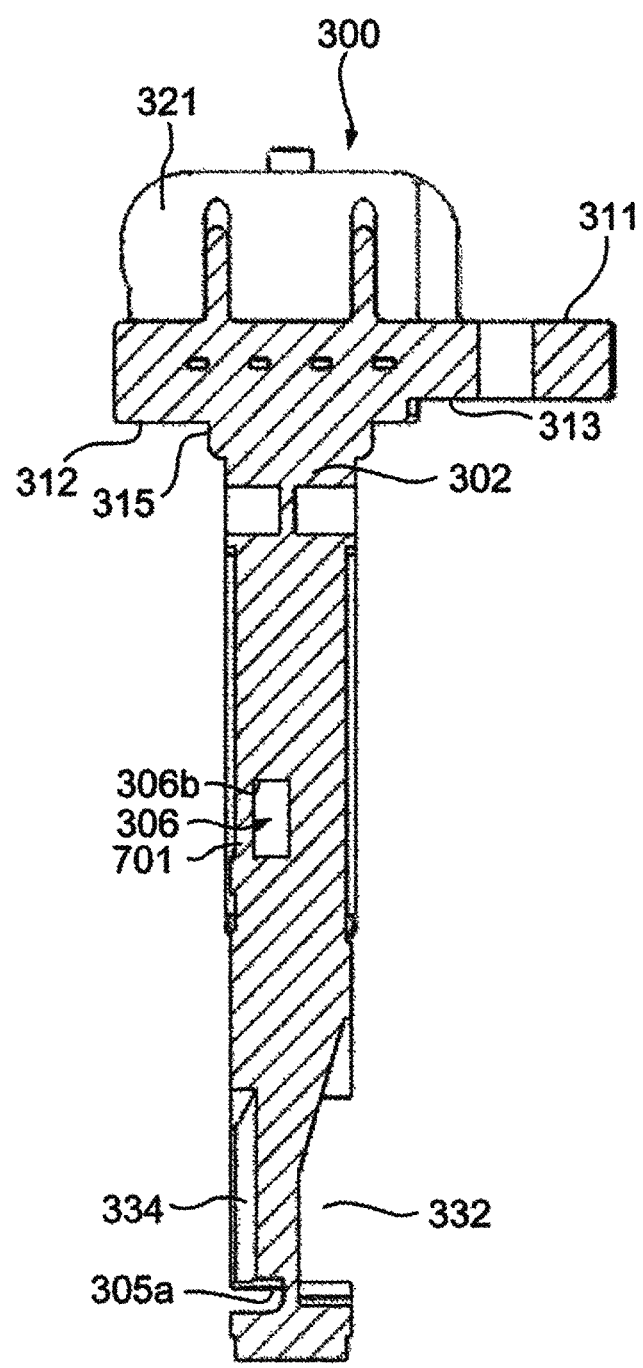
FIG. 29 is a cross-sectional view taken along line N-N of FIG. 28.

In addition, referring to FIGS. 28 and 29, the example in which the reinforcing section 701 is disposed at the position that is not on the projection plane of the circuit substrate 400 will be described. FIG. 28(a) is an appearance diagram of the physical quantity detection apparatus 300 of this example. FIG. 28(b) is an enlarged view near the second sub-passage outlet 306b. FIG. 29 is a cross-sectional view taken along line N-N of FIG. 28. In FIG. 28(b), the reinforcing section 701 is not formed on the projection plane of the circuit substrate 400 at the position of the second sub-passage outlet 306b, and is formed only the outside from the projection plane of the circuit substrate 400. That is, when the reinforcing section 701 is placed on any cross section on the second sub-passage connecting the second sub-passage inlet 306a and the second sub-passage outlet 306b, the effect of the present invention can be provided.

It is noted that the reinforcing section 701 of this example has an effective configuration when the circuit substrate 400 is insert molded, and a fluid admitting section and a fluid exiting section are formed simultaneously with the insert molding. Thus, although the reinforcing section 701 is disposed on the circuit substrate on which the sensors are mounted, the effect can also be provided when the reinforcing section 701 is disposed even on the sub-passage disposed for cooling the circuit substrate.

The embodiments of the present invention have been described above in detail, but the present invention is not limited to the embodiments, and various design changes can be made within the scope not departing the spirit of the present invention described in the claims. For example, the embodiments have been described in detail to easily understand the present invention, and are not necessarily required to include all the described configurations. In addition, part of the configuration of one of the embodiments can be replaced with the configurations of the other embodiments, and the configuration of one of the embodiments can be added with the configurations of the other embodiments. Further, part of the configuration of each embodiment can be added with, deleted from, and replaced with the other configurations.

LIST OF REFERENCE SIGNS

24 Exhaust gas
30 Gas to be measured
110 Internal combustion engine
112 Engine cylinder
114 Engine piston
116 Suction valve
118 Exhaust valve
122 Air cleaner
124 Main passage
126 Throttle body
128 Suction manifold
132 Throttle valve
144 Throttle angle sensor
146 Rotation angle sensor
148 Oxygen sensor
152 Fuel injection valve
154 Ignition plug
156 Idol air control valve
200 Controller
300 Physical quantity detection apparatus
302 Housing
303 Front cover
304 Rear cover
305 First sub-passage
305a First sub-passage inlet
305b First sub-passage outlet
306 Second sub-passage
306a Second sub-passage inlet
306b Second sub-passage outlet
307 Separating wall on the upstream side of the housing
308 Separating wall on the downstream side of the housing
311 Flange
312 Lower face facing the main passage 124
313 Recess
314 Screw hole
315 Abutting section
321 External connecting section
322 Connector
322a Insertion hole
323 External terminal
324 AL wire
332 Front side sub-passage groove
333 Opening
334 Rear side sub-passage groove
334a Steep inclining section
336 Upstream side outer wall
338 Downstream side outer wall
342 Sensor chamber
350 Protrusion on the upstream side of the cover
351 Protrusion on the downstream side of the cover
400 Circuit substrate
430 Measuring flow path face
431 Measuring flow path face rear face
436 Heat transmission face exposing section
450 Protrusion
451 Temperature detecting section
452 Temperature and humidity sensor
453 Temperature sensor
454 Pressure sensor
455 Pressure sensor
456 Flow rate detecting section
605 Circuit component (microcomputer)
701 Reinforcing section

The invention claimed is:
1. An electronic apparatus comprising:
a circuit substrate;
an integrally molded body in which the circuit substrate is insert molded, the integrally molded body including
a housing portion and a reinforcing section,
a first sub-passage inlet and a second sub-passage inlet formed on a first side of the integrally molded body,
a first sub-passage outlet and a second sub-passage outlet formed on a second side of the integrally molded body, housing resins are formed on both the first side and the second side of the integrally molded body; and a fluid path sucking gas from a first end of the electronic apparatus to a second end of the electronic apparatus;

wherein the housing portion separates the circuit substrate from the reinforcing section, and wherein the second side is opposite the first side.

2. The electronic apparatus according to claim 1 further comprising:

a sensor configured to detect a physical quantity of a fluid, and wherein the sensor is mounted on either the first side or the second side.

3. The electronic apparatus according to claim 1 further comprising:

a main passage, wherein the integrally molded body is disposed in the main passage; and a plurality of detection sensors each mounted on one of the first side and the second side, wherein the plurality of detection sensors are charged to detect a plurality of physical quantities of gas to be measured flowing in the main passage.

4. The electronic apparatus according to claim 3, further comprising:

a first sub-passage sucking gas to be measured from the first sub-passage inlet and discharging the gas to be measured to the first sub-passage outlet; and a second sub-passage sucking the gas to be measured from the second sub-passage inlet and discharging the gas to be measured to the second sub-passage outlet, wherein at least one of the plurality of detection sensors is disposed in both the first sub-passage and the second sub-passage, and at least one detection sensor of the plurality of detection sensors disposed in the first sub-passage is different from the at least one detection sensor of the plurality of detection sensors disposed in the second sub-passage.

5. The electronic apparatus according to claim 4, wherein the integrally molded body has a separating wall at a position on an upstream side of the gas to be measured from the at least one detection sensor in the second sub-passage.

6. The electronic apparatus according to claim 4, wherein the integrally molded body has a separating wall at a position on a downstream side of the gas to be measured from the at least one detection sensor in the second sub-passage.

7. The electronic apparatus according to claim 4, wherein the at least one detection sensor disposed in the first sub-passage and the at least one detection sensor disposed in the second sub-passage detect the physical quantities that are different from each other.

8. The electronic apparatus according to claim 4, further comprising;

a detection sensor face region in which at least one of the plurality of the detection sensors is disposed on a first face of the circuit substrate;

a circuit component face region in which a circuit component other than the detection sensor is disposed; and an opposite face region facing the circuit component face region on a second face of the circuit substrate, wherein at least part of the opposite face region on the second face of the circuit substrate is exposed to the second sub-passage.

9. The electronic apparatus according to claim 8, wherein the second sub-passage is constituted by cooperation of the integrally molded body, the circuit substrate, and a cover joined to the integrally molded body.

10. The electronic apparatus according to claim 9, wherein the second sub-passage extends in parallel along a flow direction of the gas to be measured flowing in the main passage, and the at least one of the plurality of the detection sensors in the detection sensor face region are disposed at positions spaced from each other in a direction crossing a straight line connecting the second sub-passage inlet and the second sub-passage outlet.

11. The electronic apparatus according to claim 9, wherein the second side has a sectioning wall sectioning the second sub-passage into a passage connecting the second sub-passage inlet and the second sub-passage outlet and a sensor chamber in which at least one of the plurality of the detection sensors are disposed.

* * * * *